(12) United States Patent
Martini et al.

(10) Patent No.: US 9,207,066 B2
(45) Date of Patent: Dec. 8, 2015

(54) SPATIAL MODULATION OF LIGHT TO DETERMINE DIMENSIONAL CHARACTERISTICS OF OBJECTS IN A FLOW PATH

(71) Applicant: Palo Alto Research Center Incorporated, Palo Alto, CA (US)

(72) Inventors: Joerg Martini, San Francisco, CA (US); Marshall W. Bern, San Carlos, CA (US); Noble M. Johnson, Menlo Park, CA (US); Peter Kiesel, Palo Alto, CA (US); Doron Kletter, San Mateo, CA (US); Bowen Cheng, Atherton, CA (US); Michael I. Recht, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 6 days.

(21) Appl. No.: 14/181,524

(22) Filed: Feb. 14, 2014

(65) Prior Publication Data

US 2015/0233704 A1    Aug. 20, 2015

(51) Int. Cl.
*G01B 11/04* (2006.01)
*G01B 11/06* (2006.01)

(52) U.S. Cl.
CPC .......... *G01B 11/046* (2013.01); *G01B 11/0691* (2013.01)

(58) Field of Classification Search
USPC ................ 356/416–417, 436, 335–339, 519; 250/459.1, 208.2
See application file for complete search history.

(56) References Cited

U.S. PATENT DOCUMENTS

| | | |
|---|---|---|
| 4,037,965 A | 7/1977 | Weiss |
| 4,172,227 A | 10/1979 | Tyrer et al. |
| 4,441,816 A | 4/1984 | Hencken et al. |
| 6,213,579 B1 | 4/2001 | Cornell et al. |
| 7,104,634 B2 | 9/2006 | Weksler et al. |
| 7,358,476 B2 | 4/2008 | Kiesel et al. |
| 7,386,199 B2 | 6/2008 | Schmidt et al. |
| 7,420,677 B2 | 9/2008 | Schmidt et al. |
| 7,547,904 B2 | 6/2009 | Schmidt et al. |

(Continued)

FOREIGN PATENT DOCUMENTS

| | | |
|---|---|---|
| WO | WO0194938 | 12/2001 |
| WO | WO2005017969 | 2/2005 |

OTHER PUBLICATIONS

U.S. Appl. No. 14/155,094, filed Jan. 14, 2014, Martini et al.

(Continued)

*Primary Examiner* — Sang Nguyen
(74) *Attorney, Agent, or Firm* — Hollingsworth Davis, LLC

(57) ABSTRACT

A device includes a spatial filter arranged in a Cartesian coordinate system having orthogonal x, y, and z axes. The spatial filter has mask features that are more light transmissive and mask features that are less light transmissive. The mask features are arranged along the x-axis in the flow direction of a flow path. A detector is positioned to detect light emanating from at least one object in the flow path, the object having a width along the y-axis, a thickness along the z-axis, and a length along the x-axis. Light emanating from the object is time modulated according to the mask features as the object moves along the flow path. The detector is configured to generate a time-varying electrical signal in response to the detected light that includes information about the width or thickness of the object.

31 Claims, 35 Drawing Sheets

(56) References Cited

U.S. PATENT DOCUMENTS

| | | | |
|---|---|---|---|
| 7,688,427 B2 | 3/2010 | Cox et al. | |
| 7,701,580 B2 | 4/2010 | Bassler et al. | |
| 7,817,254 B2* | 10/2010 | Hegyi et al. | 356/28 |
| 7,817,276 B2* | 10/2010 | Kiesel et al. | 356/436 |
| 7,894,068 B2 | 2/2011 | Bassler et al. | |
| 8,203,711 B2 | 6/2012 | Shinoda | |
| 8,373,860 B2 | 2/2013 | Kiesel et al. | |
| 8,388,569 B2 | 3/2013 | Uhland et al. | |
| 8,629,981 B2 | 1/2014 | Martini et al. | |
| 8,821,799 B2* | 9/2014 | Bassler et al. | 422/105 |
| 2003/0203502 A1* | 10/2003 | Zenhausern et al. | 436/164 |
| 2004/0226386 A1* | 11/2004 | Gysling et al. | 73/861.42 |
| 2008/0181827 A1 | 7/2008 | Bassler et al. | |
| 2008/0183418 A1 | 7/2008 | Bassler et al. | |
| 2010/0225913 A1* | 9/2010 | Trainer | 356/338 |
| 2011/0222062 A1* | 9/2011 | Martini et al. | 356/417 |
| 2012/0194590 A1 | 8/2012 | Suzuki | |
| 2012/0236291 A1 | 9/2012 | Pittaro et al. | |
| 2013/0016335 A1 | 1/2013 | Lo et al. | |
| 2013/0037726 A1* | 2/2013 | Kiesel et al. | 250/458.1 |
| 2013/0037728 A1 | 2/2013 | Kiesel et al. | |

OTHER PUBLICATIONS

Kiesel et al., "Spatially Modulated Fluorescence Emission from Moving Particles", Appl. Phys. Lett. 94, 2009, pp. 041107-1-041107-3.
Kiesel et al., "Spatially Modulated Emission Advances Point-of-Care Diagnostics", Laser Focus World, Nov. 2010, pp. 47-50.
Petersson et al., "Free Flow Acoustophoresis: Micorfluidic-Based Mode of Particle and Cell Separation", Anal. Chem, 79 (14), 2007, pp. 5117-5123.
Yamada et al., "Pinched flow fractionation: continuous size separation of particles utilizing a laminar flow profile in a pinched microchannel", Anal. Chem. 76 (18), Sep. 2004, pp. 5465-5471. (abstract only).
Yamada et al., "Microfluidic Particle Sorter Employing Flow Splitting and Recombining", Anal. Chem. 78, 2006, pp. 1357-1362.
Ji et al., "Silicon-based microfilters for whole blood cell separation", Biomed Microdevices 10(2), 2008, pp. 251-257. (abstract only).
Schrum et al., "Microchip Flow Cytometry Using Electrokinetic Focusing", Anal. Chem. 71 (19), Oct. 1999, pp. 4173-4177. (abstract only).
Huh et al., "Microfluidics for flow cytometric analysis of cells and particles" Physiol. Meas. 26 (3), Jun. 2005, pp. R73-98. (abstract only).
Fu et al. "Electrokinetically driven micro flow cytometers with integrated fiber optics for on-line cell-particle detection", Analytica Chimica Acta, Vo. 507 (1), Apr. 2004, pp. 163-169. (abstract only)
Lee, Gwo-Bin et al., "Micromachine-based multi-channel flow cytometers for cell/particle counting and sorting", J. Micromech, Microeng. 15 (2005) 447-454. (abstract only).
Lin et al., "Vertical focusing device utilizing dielectrophoretic force and its application on microflow cytometer", Journal of Microelectromechanical Systems, vol. 13, No. 6, Dec. 2004, 10 pages.
Zhu et al., "Dielectrophoretic focusing of particles in a microchannel constriction using DC-biased AC flectric fields", Electrophoresis, vol. 30 (15), Jul. 2009. (abstract only).
Chu et al., "A three-dimensional (3D) particle focusing channel using the positive dielectrophoresis (pDEP) guided by a dielectric structure between two planar electrodes", Lab on a Chip, Issue 5m 2009, pp. 688-691. (abstract only).
Chang et al., Three-dimensional hydrodynamic focusing in two-layer polydimethylsiloxane (PDMS) microchannels, J. Michromech. Microeng 17, 2007, pp. 1479-1486.
Sheng et al., "Digital holographic microscope for measuring three-dimensional particle distributions and motions", Applied Optics, Vo. 45 (16), Jun. 2006, pp. 3893-3901.
Lindken et al., "Stereoscopic micro particle image velocimetry" Experiments in Fluids, 41, 2006, pp. 161-171.
Pereira et al., "Microscale 3D flow mapping with µDDPIV", Experiments in Fluids, vol. 42 (4), Apr. 2007, pp. 589-599. (abstract only).
Cheong et al., "Flow Visualizaiton and Flow Cytometry with Holographic Video Microscopy", Optics Express 17, 2009, pp. 13071-13079.
Lima et al., "Confocal micro-PIV measurements of three dimensional profiles of cell suspension flow in a square microchannel", Measurement Science and Technology, vol. 17, 2006, pp. 797-808.
Pugia et al., "Microfluidic Tool Box as Technology Platform for Hand-Held Diagnostics", Clinical Chemistry, vol. 51 (10), 2005, pp. 1923-1932.
File History for U.S. Appl. No. 13/206,436 as retrieved from the U.S. Patent and Trademark Office.
File History for U.S. Appl. No. 12/024,490 as retrieved from the U.S. Patent and Trademark Office.
File History for U.S. Appl. No. 12/762,702 as retrieved from the U.S. Patent and Trademark Office.
File History for U.S. Appl. No. 13/113,021 as retrieved from the U.S. Patent and Trademark Office.
U.S. Appl. No. 14/181,560, Kletter et al., filed Feb. 14, 2014.
U.S. Appl. No. 14/181,530, Martini et al., filed Feb. 14, 2014.
U.S. Appl. No. 14/181,571, Martini et al., filed Feb. 14, 2014.
File History for U.S. Appl. No. 14/246,912 as retrieved from the U.S. Patent and Trademark Office.
File History for U.S. Appl. No. 14/246,893 as retrieved from the U.S. Patent and Trademark Office.

* cited by examiner

SPATIAL MODULATION OF LIGHT TO DETERMINE DIMENSIONAL CHARACTERISTICS OF OBJECTS IN A FLOW PATH

STATEMENT REGARDING FEDERALLY SPONSORED RESEARCH AND DEVELOPMENT

This invention was made with government support under contract number W911NF-10-1-0479 (3711), awarded by the Department of Defense. The U.S. Government has certain rights in this invention.

TECHNICAL FIELD

This application relates generally to techniques for performing analysis by evaluating using light emanating from the objects in a flow path. The application also relates to components, devices, systems, and methods pertaining to such techniques.

BACKGROUND

The present disclosure relates generally to techniques that determine object characteristics using light emanating from the objects. More specifically, the techniques can use filter arrangements to transmit and/or reflect light with time variation, such as where the objects are moving relative to the filter arrangements.

Various techniques have been proposed for using light emanating from objects. For example, U.S. Pat. No. 7,358,476 (Kiesel et al.) describes a fluidic structure with a channel along which is a series of sensing components to obtain information about objects traveling within the channel, such as droplets or other objects carried by fluid. A sensing component includes a set of cells that photosense a range of photon energies that emanate from objects. A processor can receive information about objects from the sensing components and use it to obtain spectral information. Additional techniques are described, for example, in U.S. Patent Application Publications 2008/0181827 (Bassler et al.) and 2008/0183418 (Bassler et al.) and in U.S. Pat. No. 7,701,580 (Bassler et al.), U.S. Pat. No. 7,894,068 (Bassler et al.), U.S. Pat. No. 7,547,904 (Schmidt et al.), U.S. Pat. No. 8,373,860 (Kiesel et al.), U.S. Pat. No. 7,420,677 (Schmidt et al.), and U.S. Pat. No. 7,386,199 (Schmidt et al.).

Also, various flow cytometry techniques have been proposed.

SUMMARY

Some embodiments involve an assembly that includes a spatial filter arranged in a Cartesian coordinate system having orthogonal x, y, and z axes. The spatial filter includes mask features that are more light transmissive and mask features that are less light transmissive, the mask features are arranged along the and x-axis in a flow direction of a flow path. The assembly further includes a detector positioned to detect light emanating from at least one object in the flow path, the object having a width along the y-axis, a thickness along the z-axis, and a length along the x-axis. The light emanating from the object is time modulated according to the mask features as the object moves along the flow path. The detector is configured to generate a time-varying electrical signal in response to the detected light. An analyzer is configured to determine the width or thickness of the object based on the signal.

Some embodiments are directed to an assembly arranged in relation to Cartesian coordinate system having orthogonal x, y, and z axes. The assembly includes a spatial filter disposed in a plane along a flow direction of a flow path. The spatial filter has mask features that are more light transmissive and mask features that are less light transmissive. A detector is positioned to detect light emanating from at least one object in the flow path, the object having a width along the y-axis, a thickness along the z-axis, and a length along the x-axis. Light emanating from the object is time modulated according to the mask features as the object moves along the flow path. The detector generates a time-varying electrical signal in response to the detected light. Signal processing circuitry transforms the time varying signal to a frequency domain signal and an analyzer determines the width or the thickness and the length of the object based on the frequency domain signal.

In some embodiments, a method includes modulating light using a spatial filter disposed along a longitudinal x-axis of a flow path, the spatial filter including mask features that are more light transmissive and mask features that are less light transmissive. Light emanating from at least one object in the flow path is detected, the object has a width along a y-axis, a thickness along a z-axis, and length along the x-axis. The light emanating from the object is time modulated according to the mask features as the object moves along the longitudinal axis of the flow path. A time varying signal is generated in response to the detected light, the time varying electrical signal including information about the width or the thickness of the object.

Some embodiments are directed a device is arranged in relation to Cartesian coordinate system having orthogonal x, y, and z axes, wherein the device includes a spatial filter having mask features that are more light transmissive and mask features that are less light transmissive, the mask features disposed along the x-axis in the flow direction of a flow path. At least one detector is positioned to detect light emanating from at least one object in the flow path, the object having a width along the y-axis, a thickness along the z-axis, and length along the x-axis. The light emanating from the object is time modulated according to the mask features as the object moves along the flow direction of the flow path. The detector to generates a time-varying electrical signal in response to the detected light, the time-varying electrical signal containing information about at least two of the length, width, and thickness of the object.

In some embodiments, a device is arranged in relation to Cartesian coordinate system having orthogonal x, y, and z axes. The device includes first and second spatial filters, each spatial filter including mask features that are more light transmissive and mask features that are less light transmissive. The mask features disposed along the x-axis in the flow direction of a flow path. The first spatial filter is arranged in first plane and the second spatial filter is arranged in a second plane, different from the first plane. First and second detectors are positioned to detect light emanating from at least one object in the flow path, the object having a width along the y-axis, a thickness along the z-axis, and length along the x-axis. The light emanating from the object is time modulated according to the mask features as the object moves along the flow direction of the flow path. The first detector generates a first time-varying electrical signal in response to the detected light. The first time-varying electrical signal contains information about at the width of the object. The second detector generates a second time-varying electrical signal in response to the detected light. The second time-varying electrical signal contains information about at the thickness of the object.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
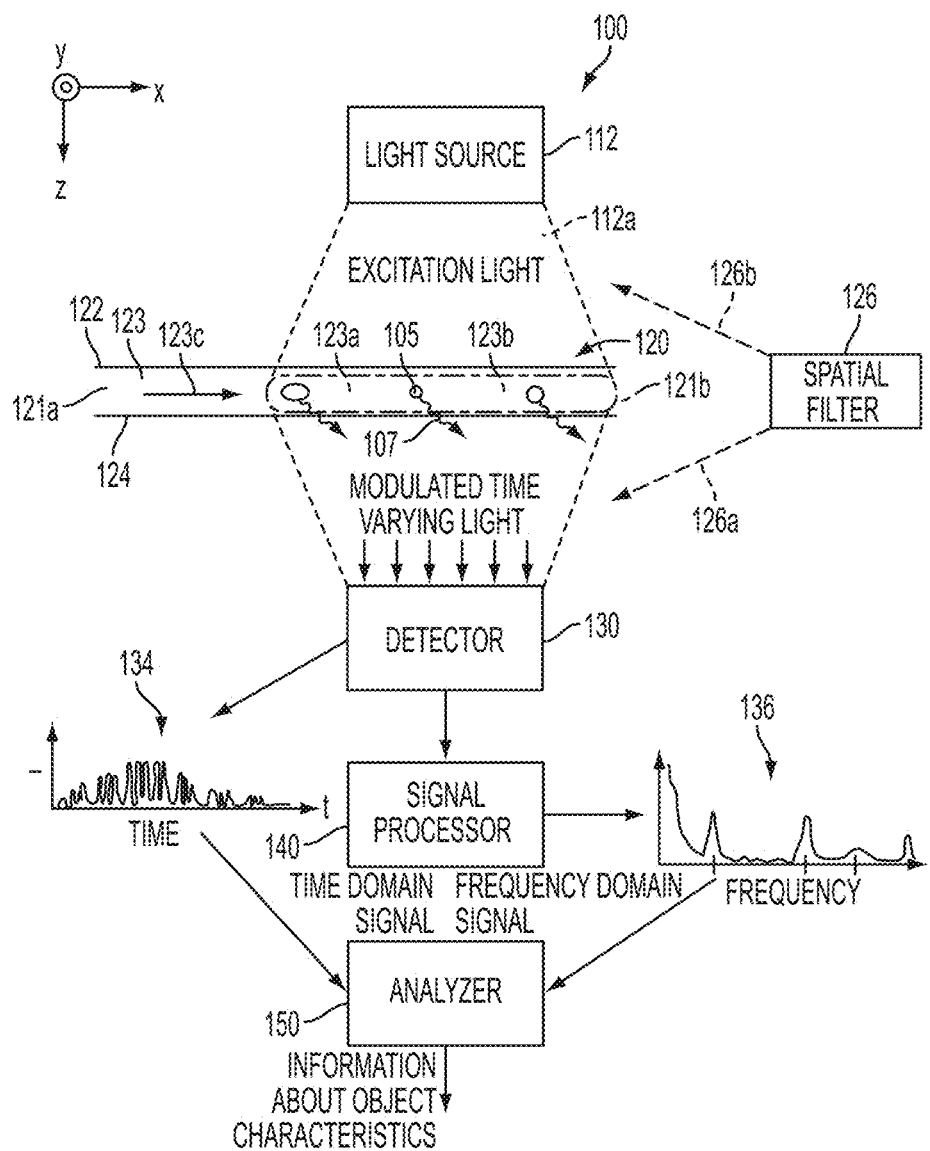
FIG. 1 is an example embodiment of an assembly with a spatial filter, detector, and analyzer configured to determine object characteristics based on spatially modulated light.

Various techniques have been proposed for using light emanating from objects. These techniques can be used for various applications and are generally effective for recognizing and obtaining object characteristics such as charge, porosity, surface characteristics, elasticity, and material composition for particular analytes. However, for simplicity, many of these techniques make assumptions about object's dimensional characteristics such as the object's size and shape. For example, size determination in Coulter counters assume the object to have a spherical shape with all dimensions matching the obtained size measurement. The same is true for measurements based on scattering in flow cytometers. While this technique simplifies analysis, obtaining true dimensions for a width and a thickness of the object can be desirable in some circumstances as objects of interest in flow cytometry are not necessarily spherical. For example, red blood cells, budding yeast, sperm cells, or E. coli deviate from a spherical shape. Usually, dimensional information on particles are based on imaging techniques such as microscopy or imaging cytometry. Understanding the true dimensional characteristics can aid in monitoring and tailoring delivery of objects in applications such as ink jet printing and drug delivery, and can effectively be used for discriminating true objects of interest from floating debris of the wrong shape or size in any dimension.

The embodiments described herein perform sample analysis to determine the dimensional characteristics of an object to gain a more accurate understanding of these characteristics. The dimensional characteristics determination is based on spatially modulated light emanating from the object. The embodiments described herein involve techniques for determining a multidimensional shape and size of objects traveling along a flow channel without the use of a imaging sensor such as a camera. Thus, the techniques and embodiments disclosed can be used to determine object length along the longitudinal axis (x-axis) parallel to the flow path, object width along the lateral axis (y-axis) perpendicular to the flow path, and/or object thickness along the observation axis (z-axis) perpendicular to the flow path.

The embodiments described herein involve the use of a spatial mask that can be deployed in a variety of applications, including analysis of system properties and/or detection of various characteristics of analyte in a sample. In some implementations, a non-imaging photodetector can be used to generate a time varying electrical output signal based on the spatially modulated light allowing for better compatibility with high-throughput cytometry.

It will be understood that the techniques, apparatuses, systems, and methods described herein are applicable to detect various objects such as analytes or particles present in a sample. The term "object" refers broadly to any object of interest to be detected. In some applications, objects of interest are particles or analytes that are relatively small, and may be microscopic in size. However, the techniques are broadly applicable to objects of any size or shape. A given particle or analyte may be or include one or a collection of biological cell(s), virus(es), molecule(s), certain proteins or protein chains, DNA or RNA fragments, molecular complex(es), droplets (e.g. oil in water), emulsions, gas bubbles, microparticles, nanoparticles, beads or other small particles that can bind and carry specific chemicals or other analytes.

In some embodiments, sensors can obtain information about objects by receiving signals from them; for example, signals in the form of light can emanate from an object, whether through emission (e.g. radiation, fluorescence, incandescence, chemoluminescence, bioluminescence, other forms of luminescence, etc.), scattering (e.g. reflection, deflection, diffraction, refraction, etc.), or transmission, and can be sensed by a photodetector. Cells or other particles may be treated, e.g., stained or tagged with a suitable fluorescent probe or other agent, in such a way that they emit light or absorb light in a predictable fashion when illuminated with excitation light. In this regard, the light emitted by a given excited particle may be fluorescent in nature, or it may constitute a form of scattered light such as in the case of Raman scattering. For simplicity, the light that emanates from (by e.g., scattering, emission, or transmission) an object is referred to herein as "emanating light" or "light emanating." It will be understood that the techniques, assemblies, apparatuses, systems, and methods described herein are applicable to detecting all forms of light emanating from an object or constituent parts thereof.

FIG. 1 is an example of an assembly 100 configured to determine object characteristics based on spatially modulated light. The assembly 100 includes a light source 112, a mask, e.g., a spatial filter 126, a flow path, e.g., within fluidic device 120, a light detector 130, optionally a signal processor 140, and an analyzer 150. Components of the assembly 100 are arranged in a coordinate system that includes a longitudinal axis, designated as the x-axis herein, a lateral axis, designated as the y-axis, and a depth axis, designated as the z-axis. In the description below, the flow direction of the flow path or flow channel is selected to lie along the longitudinal axis of the coordinate system, and the longitudinal, lateral, and depth axes are orthogonal to one another. Those skilled in the art will appreciate that any coordinate system could alternatively be selected, that the arrangement of the assembly with respect to the coordinate system is arbitrary and does not change the operation of the assembly, and that non-orthogonal axis systems could alternatively be used.

The device 120 is adapted to receive a sample of interest to be analyzed. The sample may enter the device 120 at an inlet 121a thereof and exit the device 120 at an outlet 121b thereof, flowing generally along the x-direction through a flow channel 123 formed between confining members 122, 124. The members 122, 124 may be or comprise plates or sheets of glass, plastic, or other suitable materials. One or both of members 122, 124 may be a microscope slide or a microscope cover glass, or portion thereof. The members 122, 124 need not, however, be planar in shape. For example, they may be portions of a unitary tube or pipe having a cross section that is circular, rectangular, or another shape. Other non-planar shapes are also contemplated. In some cases, confinement of the sample may not be necessary, whereupon one or both of members 122, 124 may be omitted. At least a portion of the confining member 122 is transmissive to excitation light emitted by the light source 112 at least in an excitation region 123a. In that regard, light source 112 may emit excitation light 112a towards the fluidic device 120.

In some cases, for example, the light source 112 may comprise a conventional light emitting diode (LED) source or a resonant cavity LED (RC-LED) source. If desired, the light source may incorporate one or more filters to narrow or otherwise tailor the spectrum of the resultant output light. Whichever type of light source is selected, the spectral makeup or composition of the excitation light emitted by the source 112 is preferably tailored to excite, scatter, or otherwise cause emanation of light from at least some of the objects that may be present in the sample, as discussed further below.

The sample is depicted as containing objects 105 that emanate light 107 in all directions (only some directions are illustrated). The objects 105 may have a variety of characteristics, some of which can be determined by the analyzer 150 based on the emanating light 107.

The detector 130 receives time varying light and generates an electrical signal in response to the time varying light. The time variation in the light detected by the detector 130 may be the result of interaction between the excitation light and an input spatial filter to create spatially patterned excitation light that illuminates the object 105. Alternatively, the time variation in the light detected by the detector 130 may be the result of interaction between light emanating from the objects 105 and an output spatial filter. In some embodiments, the detector includes an optical filter arranged between the detector and the objects. An optical filter can be particularly useful when the emanating light is fluorescent light and the optical filter is configured to substantially block the wavelengths of the excitation light and to substantially pass the wavelengths of the light emanating from the objects.

The assembly 100 of FIG. 1 includes the spatial filter 126 (sometimes referred to as a mask) which can be positioned in various locations. Dashed arrows 126a and 126b indicate possible locations of the spatial filter 126 to provide spatially modulated light and/or modulated excitation light. In some configurations, indicated by arrow 126a, the spatial filter 126 can be disposed between the flow channel 123 and the detector 130. In this position, the spatial filter 126 is referred to as an output spatial mask. In other configurations, indicated by arrow 126b, the spatial filter 126 can be disposed between the light source 112 and the flow channel 123. In this position, the spatial filter 126 is referred to as an input spatial filter. An input spatial filter may be adapted to transmit light emitted by the light source by varying amounts along the excitation region 123a of the flow channel 123. In this configuration, the input spatial filter creates patterned light in the excitation region 123a of the flow channel 123. According to various implementations, an input spatial filter may comprise a physical mask including a sequence or pattern of first regions that have a first optical characteristic, e.g., are more light transmissive, and second regions that have a second optical characteristic, different from the first characteristic, e.g., are less light transmissive. For example, the first features may be substantially transmissive to the wavelengths of light being modulated by the mask features and the second features may be substantially opaque to the wavelengths of light being modulated by the mask features. The terms "first" and "second" are used herein to identify mask features or mask regions, however, these terms are not meant imply any particular order or arrangement of the mask features. For example, a first feature or region may precede a second feature region along the flow direction or a second feature or region may precede a first feature or region along the flow direction. The input spatial filter may alternatively or additionally comprise micro-optics or a patterned light source configured to create the excitation pattern. The excitation pattern can be imaged and/or directed onto the excitation region 123a using optical components for the imaging (e.g., lenses) and/or direction, (e.g., fiber optics or waveguides).

In some embodiments an output spatial filter may be utilized and disposed between the objects 105 and the detector 130 at a detection region 123b of the flow channel. In some embodiments, the excitation region 123a and the detection region 123b overlap. In other embodiments, there may be partial overlap between the excitation and detection regions or the excitation and detection regions may be non-overlapping or multiple detection regions and/or excitation regions may be used with various overlapping and/or non-overlapping arrangements. In the assembly 100 shown in FIG. 1, the output spatial filter may be adapted to interact with the light 107 emanating from the objects 105 in the flow channel 123. In some embodiments, the output spatial filter may be a physical mask comprising a sequence or pattern of first regions that are more light transmissive and second regions that are less light transmissive. In some embodiments, color spatial filters may be used such that a first region of the color spatial filter is more transmissive to a first wavelength band and less transmissive to a second wavelength band and a second region of the color spatial filter is less transmissive to the first wavelength band and is more transmissive to the second wavelength band.

According to some embodiments of an assembly 100 that include an input spatial filter, as an object 105 travels in the flow direction 123c in the excitation region 123a of the flow channel 123, light emanating from the light source 112 is alternately substantially transmitted to the object 105 and substantially blocked or partially blocked from reaching the object 105 as the object 105 travels along the flow direction 123c. The alternate transmission and non-transmission (or reduced transmission) of the excitation light 112a along the flow direction 123c produces time-varying light 107 emanating from the object 105. The time-varying light 107 emanating from the object 105 falls on the detector 130 and, in response, the detector 130 generates a time-varying detector output signal 134.

According to some embodiments of the assembly 100 that include the output spatial filter configuration, light 112a from the light source 112 illuminates the object 105, causing the object 105 to emanate light 107. As the object 105 travels in the flow direction 123c in the detection region 123b, the output spatial filter alternatively substantially blocks the light 107 emanating from the object 105 from reaching the detector 130 and substantially transmits the light 107 emanating from the object 105 to the detector 130. The alternate substantial transmission and blocking (or partial blocking) of the light 107 emanating from the object 105 as the object 105 flows through the detection region 123b produces time varying light that falls on the detector 130. In response, the detector 130 generates the time-varying detector output signal 134.

In some embodiments such as the embodiment of FIG. 1, the analyzer 150 may include a signal transform processor 140 that converts the time-varying detector output signal 134 to a frequency domain output signal 136 so as to, for example, provide spectral power as a function of frequency. The signal transform processor 140 is shown as part of the analyzer 150 in this embodiment, but may be part of the detector in some embodiments or may comprise separate circuitry in other embodiments. For example, in some embodiments, the signal transform processor may be part of the analyzer circuitry along with the detector.

For conversion, the signal processor 140 may use techniques such as discrete Fourier transform including, for example, a Fast Fourier Transform "FFT" algorithm. Thus, the frequency domain output signal 136 represents the frequency component magnitude of the time-varying detector output signal 134, where the frequency component magnitude is the amount or magnitude of a given frequency component that is present in the time-varying detector output signal 134. The Fourier signal power is a relevant parameter or measure because it corresponds to the function or value one would obtain by calculating in a straightforward manner the Fourier transform (e.g. using a Fast Fourier Transform "FFT" algorithm) of the time-varying signal 134. However, other methods or techniques of representing the frequency component magnitude, or other measures of the frequency component magnitude, may also be used. Examples may include e.g. the square root of the Fourier signal power, or the signal strength (e.g. as measured in voltage or current) obtained from a filter that receives as input the time-varying detector output signal 134.

In FIG. 1, the time-varying detector output signal 134 and/or the frequency domain detector output signal 136 can be passed to the analysis circuitry 151 of the analyzer 150. The analysis circuitry 151 is configured to receive the time-varying detector output signal 134 and/or the frequency domain detector output signal 136 and to determine one or more spatial characteristics of the object 105 including a depth of the object 105 within the flow channel 123 based upon the time-varying detector output signal 134 and/or the frequency domain detector output signal 136. As will be discussed subsequently, the various embodiments discussed herein provide examples of techniques for determining the one or more dimensional characteristics of the object 105 using various mask designs and processing techniques. As used herein, the depth of the object 105 is a distance of the object 105 within the flow channel 123 as measured along the z-direction of the Cartesian coordinate system of FIG. 1. Thus, the depth is a distance generally perpendicular to the flow direction 123c along the flow channel 123.

Figure 2A:
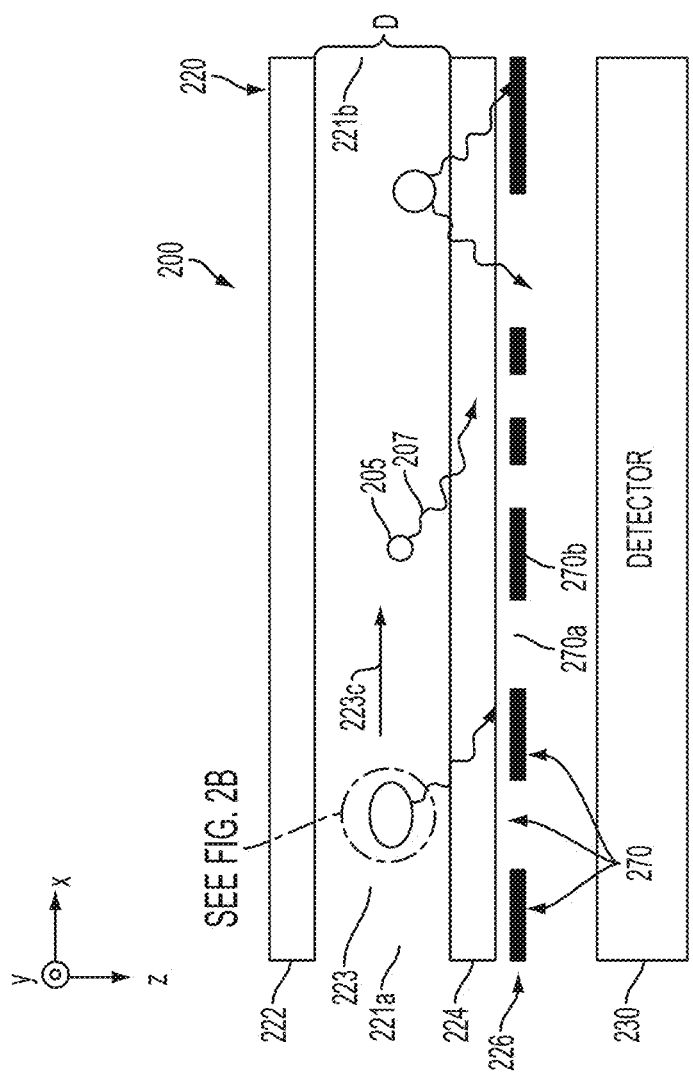
FIG. 2A is a schematic view of another example embodiment of an assembly with the spatial filter positioned between the object and the detector with the spatial filter spaced apart from the flow channel by a distance greater than a depth of the flow channel.
Figure 2B:
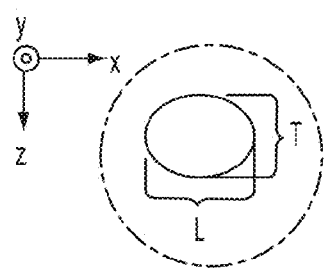
FIG. 2B is an enlargement of one of the objects of FIG. 2A showing the object may have different width, thickness and length dimensions.

FIG. 2A is an enlarged schematic view of a portion of an assembly 200 according to another example embodiment. The portion of the assembly 200 illustrated in FIG. 2A includes a flow path, e.g., fluidic device 220, a detector 230, and a spatial filter 226. The device 220 is adapted to receive objects of interest to be analyzed. The objects may enter the device 220 at an inlet 221a thereof and exit the device 220 at an outlet 221b thereof, flowing generally in a flow direction 223c along the x-direction through a flow channel 223 formed between confining members 222, 224. As illustrated in FIG. 2B, the one or more objects 205 have dimensional characteristics including a length, L, along the x-axis; a width, W, along the lateral y-axis; and a thickness, T, along the z-axis of the Cartesian coordinate system illustrated. Without limiting the fundamental concept of the described system, the z-axis shall be chosen as the observation direction in the following descriptions.

As discussed previously, the spatial filter 226 may comprise, for example, a spatial mask. As will be discussed in greater detail subsequently, the spatial filter 226 may have a plurality of mask features 270. The mask features 270 include regions 270a having a first optical characteristic, e.g., more light transmissive regions, and regions 270b having a second optical characteristic, e.g., less light transmissive regions. For simplicity of explanation, many examples provided herein refer to mask features comprising more light transmissive regions and mask features or regions comprising less light transmissive regions. However, it will be appreciated that the optical characteristics of the first and second types of mask features may differ optically in any way, e.g., the first features may comprise regions having a first optical wavelength pass band and the second features may comprise regions having a second optical wavelength pass band different from the first optical wavelength pass band. The pattern or sequence of first features 270a and second features 270b define a transmission function that changes based on a three dimensional position of a light 207 emanating object 205 within the flow channel 223 (i.e., as measured along the x-axis, y-axis, and z-axis of the Cartesian coordinate system). This transmission function may be substantially periodic, or it may instead be substantially non-periodic. The transmission function is sensed by the detector 230, which is configured to output the time-varying output signal discussed in FIG. 1 in response.

In the embodiment of FIG. 2A, the spatial filter 226 may be substantially monochromatic or polychromatic as desired. In a monochromatic mask, the first features 270a may be more light transmissive and may all have substantially the same transmission characteristic, and the second features 270b may be less transmissive than the first features or may be non-transmissive (opaque) and also all have substantially the same transmission characteristic (different from that of the first features 270a). In a simple case, the transmissive regions 270a may all be completely clear, as in the case of an aperture, and the less transmissive regions 270b may be completely opaque, as in the case of a layer of black ink or other absorptive, reflective, or scattering material. Alternatively, the transmissive regions 270a may all have a given color or filter characteristic, e.g., high transmission for light emanating from an excited object, but low transmission for source excitation light. Alternatively, the less transmissive regions 270b may have a low but non-zero light transmission, as in the case of a grey ink or coating, or a partial absorber or reflector.

In the embodiment of FIG. 2A, the spatial filter 226 is positioned between the objects 205 and the detector 230. The light emanating 207 from the objects 205 interacts with the spatial filter 226 to provide time modulation of the sensed light that falls on the detector 230. In the illustrated embodiment, the spatial filter 226 is positioned between the objects 205 and the detector 230.

Figure 2C:
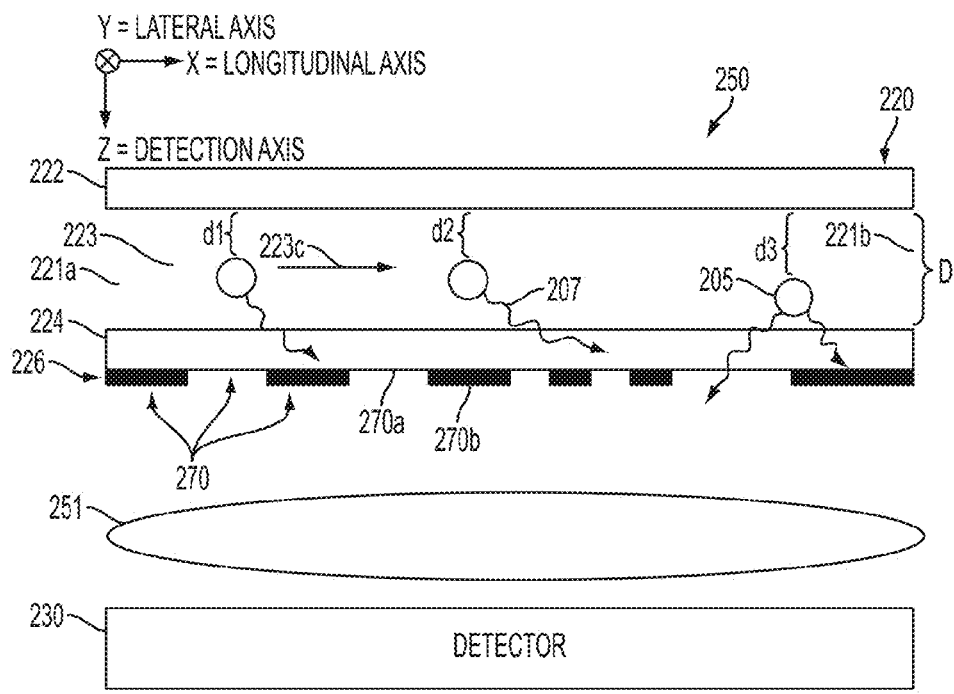
FIG. 2C is a schematic view of yet another example embodiment of an assembly an optical element positioned between the spatial filter and the detector.

FIG. 2C is an enlarged schematic view of a portion of an assembly 250 according to another example embodiment. In FIG. 2C, the fluidic device 220, spatial filter 226, and detector 230 may be the same as those depicted in FIG. 2A. The assembly portion 250 shown in FIG. 2B includes an optical element 251 disposed between the spatial filter 226 and the detector 230. The imaging element 250 may be configured to focus the spatially modulated light onto the detector 230, for example.

Figure 3:
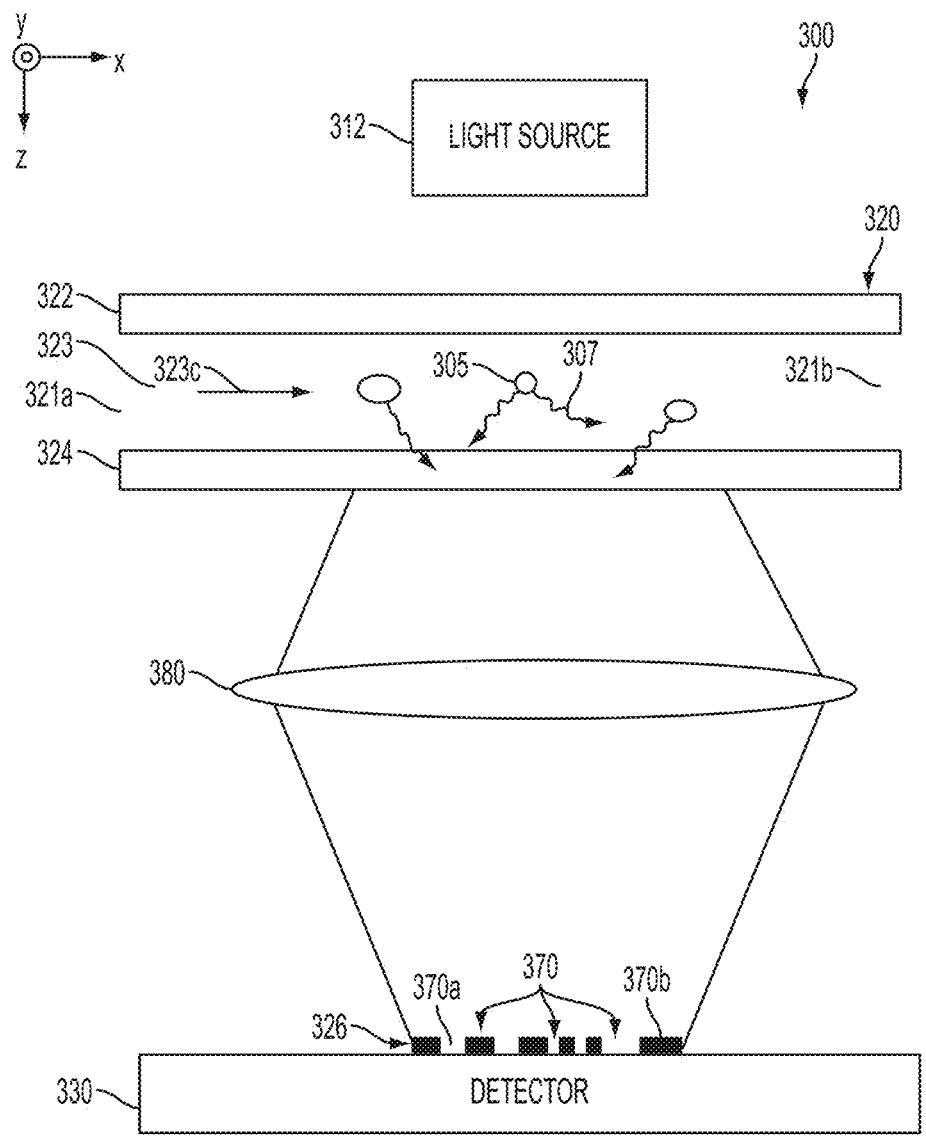
FIG. 3 is a schematic view of another example embodiment of an assembly with an optical imaging element positioned between the object and detector and the spatial filter positioned adjacent the detector.

FIG. 3 is a schematic view of another embodiment of a portion of an assembly 300 according to another example. The portion of the assembly 300 illustrated includes a light source 312, a spatial filter 326, a flow path, e.g., fluidic device 320, and a detector 330. Similar to the embodiments of FIGS. 1, 2A, and 2C, the device 320 includes an inlet 321a, an outlet 321b, a flow channel 323 having a flow direction 323c, and confining members 322, 324. The spatial filter 326 includes mask features 370 with light transmissive regions 370a and less transmissive regions 370b. In FIG. 3, the spatial filter 326 is positioned between the objects 305 and the detector 330 and is positioned remotely from the flow channel 323 immediately adjacent the detector 330. An optical imaging element 380 such as a lens is positioned between the objects 305 and the filter 326 and is configured to image light from the objects 305 onto at least one of the spatial filter 326 and detector 330. The light emanating from the objects 305 and imaged by the element 380 interacts with the spatial filter 326 to provide time modulation of the sensed light received by the detector 330.

Figure 4:
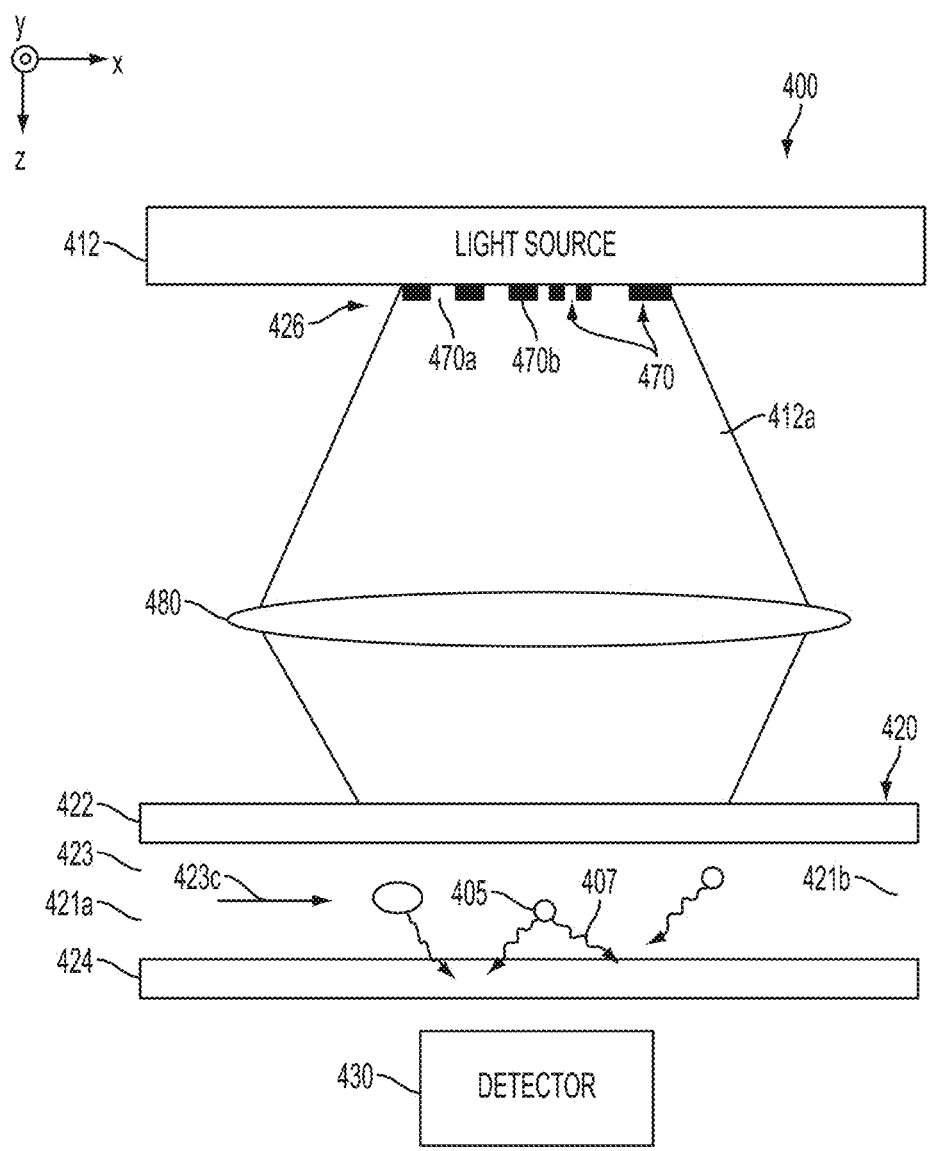
FIG. 4 is a schematic view of another example embodiment of an assembly with the optical imaging element positioned between the light source and the detector and the spatial filter positioned adjacent the light source.

FIG. 4 is a schematic view of yet another embodiment of a portion of an assembly 400. The portion of the assembly 400 illustrated includes a light source 412, a spatial filter 426, a flow path, e.g., fluidic device 420, and a detector 430. Similar to the previously discussed embodiments, the device 420 includes an inlet 421a, an outlet 421b, a flow channel 423 having a flow direction 423c, and confining members 422, 424. The spatial filter 426 includes mask features 470 with light transmissive regions 470a and less transmissive regions 470b. In FIG. 4, the spatial filter 426 is positioned between the light source 412 and the fluidic device 420 containing the objects 405. As shown, the spatial filter 426 is positioned remotely from the flow channel 423 immediately adjacent the light source 412. Interaction between the output light from the light source 412 and the spatial filter 426 causes spatially modulated excitation light 412a. An optical imaging element 480 is positioned between the filter 426 and the objects 405 and is configured to image the spatially modulated excitation light 412a onto an excitation region of the flow channel 423. Additionally, the optical imaging element 480 may incorporate one or more filters to narrow or otherwise tailor the spectrum of the resultant spatially modulated excitation light. The spatially modulated excitation light causes light 407 emanating from the objects 405 to be spatially modulated as well. The spatially modulated light emanating from the objects 405 is sensed by the detector 430.

Embodiments disclosed herein involve determining dimensional characteristics of objects moving along a flow path, such as the width of the objects measured along the lateral y-axis, the length of the objects measured along the longitudinal x-axis, and/or the thickness of the objects measured along the z axis. For example, some embodiments disclosed herein are directed to systems employing spatial filters having mask features that can be used for determining object width along a width axis (y-axis) of the flow path. As another example, some embodiments disclosed herein are directed to spatial filters having mask features that can be used for determining both object width along a lateral (y-axis) and a longitudinal (x-axis) which is the flow direction of the flow path.

Figure 5A:
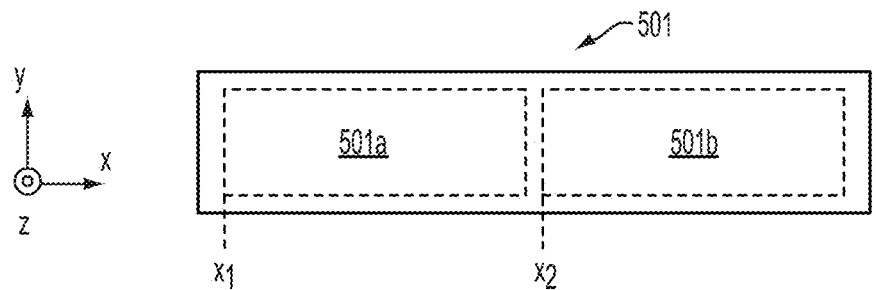
FIGS. 5A through 5C illustrate general configurations of spatial filters that can be used to determine two dimensions, e.g., both length and width, of an object in a flow path.
Figure 5B:
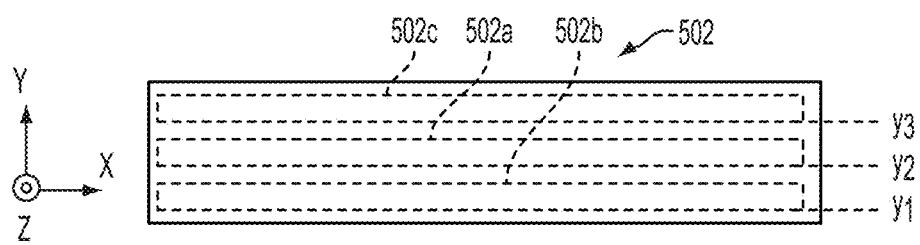
Figure 5C:
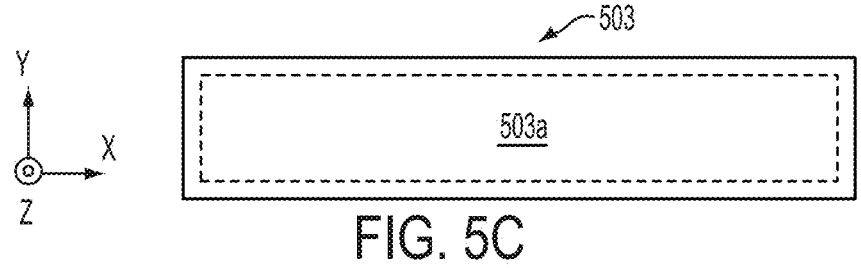

FIGS. 5A through 5C illustrate general configurations of spatial filters 501, 502, 503 that can be used to determine both length and width of an object in a flow path. The spatial filter 501 of FIG. 5A provides an example wherein a first group of features disposed along a first portion 501a of the spatial filter 501 can be used for determining object width and a second group of features disposed along a second portion 501b of the spatial filter 501 can be used for determining object length. In FIG. 5A, the first portion 501a of the spatial filter is disposed beginning at a longitudinal position, $x_1$, along the x-axis and the second portion 501b of the spatial filter is disposed at a longitudinal position, $x_2$, along the x axis.

The spatial filter 502 of FIG. 5B provides an example wherein a first group of features disposed along a first portion 502a of the spatial filter 501 can be used for determining object length and second groups of features disposed along second portions 502b, 502c of the spatial filter 502 can be used for determining object width. In FIG. 5B, the first portion 502a is disposed beginning at a lateral position, $y_2$, and the second portions 502b, 502c are disposed at a lateral positions, $y_1$, $y_3$.

The spatial filter 503 of FIG. 5C provides an example wherein features used to determine both object length and object width are interspersed along a portion 503a of the spatial filter. The spatial filters depicted in FIGS. 5A to 5C may be used for determination of object width and length.

Figure 6A:
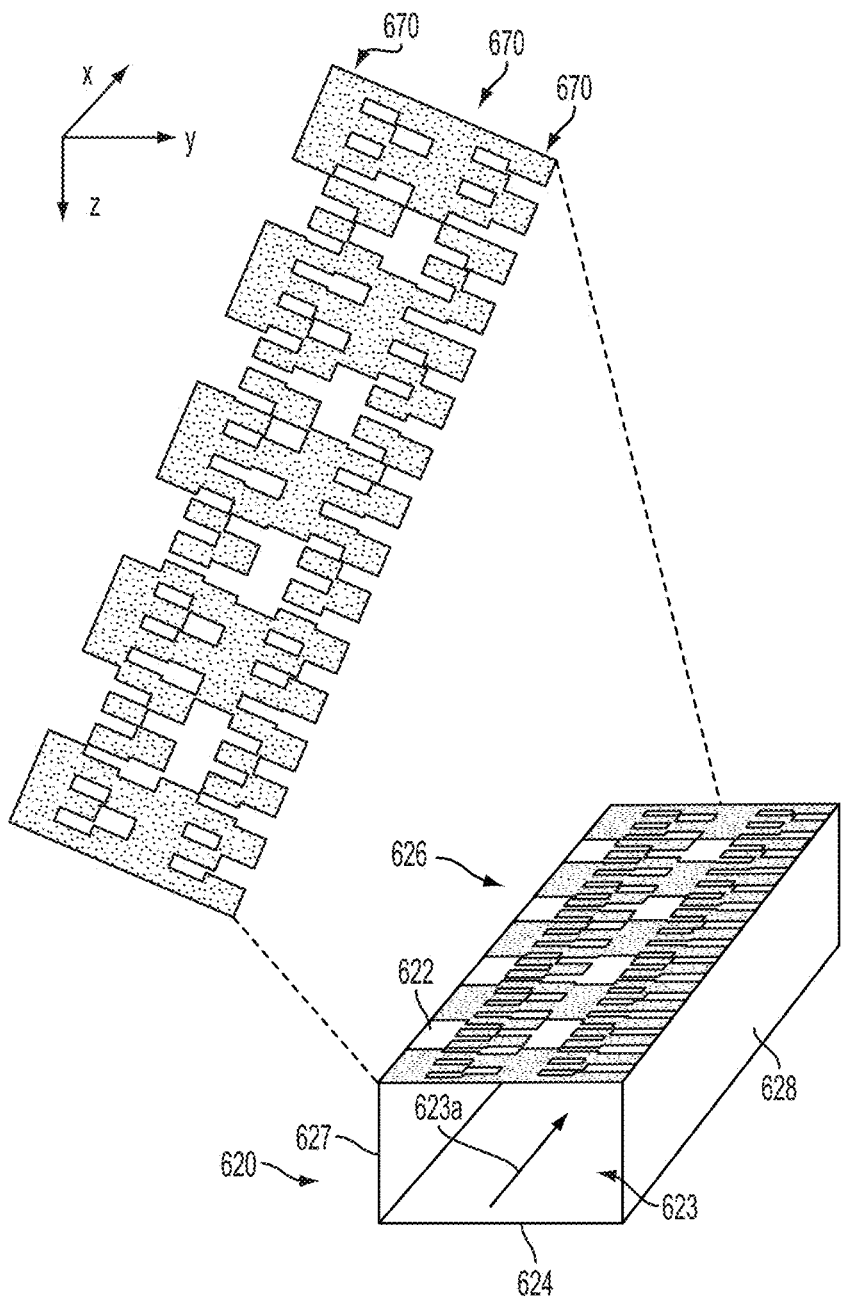
FIG. 6A is a perspective view of a spatial filter having mask features patterned according to an example embodiment.

FIG. 6A shows a perspective view of a portion of a fluidic device 620 and a spatial filter 626 comprising mask features that can be used to determine object length. The fluidic device 620 includes a flow channel 623 having a flow direction 623a and confining members 622, 624, 627, and 628. Although the confining members 622, 624, 627, and 628 are positioned to define the flow channel 623, in other embodiments, one or all of the confining members 622, 624, 627, and 628 may not be used. The flow direction 623a aligns generally with the x-direction of the Cartesian coordinate system illustrated in FIG. 5A. In the embodiment shown, the spatial filter 626 is disposed at a distance from the confining member 622. In other embodiments, the spatial filter 626 may be disposed within the flow channel 623, mounted to any of the confining members 622, 624, 627, and 628, or positioned relative to any of the confining members 622, 624, 627, and 628. A detector (not shown) may be positioned in any appropriate location to sense modulated light passing through the filter 626.

In FIG. 6A, the spatial filter 626 is arranged in the x-y plane of the Cartesian coordinate system. The spatial filter 626 has a plurality of mask features 670 arranged with a pattern generally in the flow direction 623a and a differing pattern in a direction (the y-direction) generally perpendicular to the flow direction 623a such that the modulated light and the output electrical signal that results therefrom includes a plurality of mask induced signal components at different frequencies. For example, the mask features 670 include multiple patterns in the direction lateral to the flow direction 623a. Additionally, as shown in FIG. 6B, each pattern of the multiple patterns is comprised of light transmissive 670b regions in each of 672A, 674A, 676A, 672B, 674B, and 676B and/or less light transmissive 670a regions that differ from one another to provide for multiple signal components in the output signal that are dependent upon the width of the object in a direction perpendicular to the flow direction.

In the exemplary embodiment shown in FIG. 6A, the mask features 670 have repeating periodic patterns in the x-direction (referred to herein as the longitudinal direction) and a differing periodic pattern in a direction perpendicular thereto (in the y-direction sometimes referred to herein as the lateral direction). Additionally, as shown in FIG. 6B, each of the mask features 670 has one of three lengths L in the x-direction. The three lengths L are patterned to repeat laterally across the spatial filter 626 as appropriate to distinguish the width of the objects being analyzed.

Figure 6B:
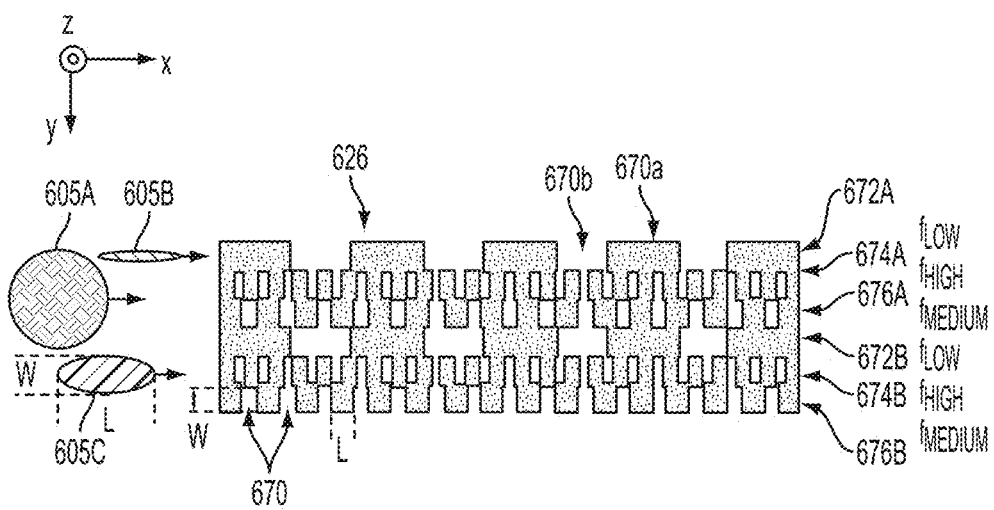
FIG. 6B is a view of the spatial filter of FIG. 6A with several objects having different dimensions illustrated.

FIG. 6B is a planar view of an enlarged portion of the spatial filter 626 of FIG. 6A illustrating the mask features 670 in greater detail. Mask features 670 include transmissive regions 672A, 674A, 676A, 672B, 674B, and 676B. In the embodiment shown, the mask features 670, including transmissive regions 672A, 674A, 676A, 672B, 674B, and 676B, are laterally differently patterned to create different frequencies in the output signal. In the embodiment shown, mask features 670 are periodically patterned. However, in other embodiments mask features 670 may be patterned in another manner (e.g., random) that allows for distinctive frequencies in the output signal. In particular, the transmissive regions 672A have a periodic pattern in the x-direction. Transmissive regions 672A are disposed laterally adjacent to (in the y-direction) and/or are connected to transmissive regions 674A, which have a differing pattern. Transmissive regions 674A are disposed laterally adjacent to (in the y-direction) and/or are connected to transmissive regions 676A, which have a differing periodic pattern. The laterally changing periodic pattern is then repeated for transmissive regions 672B, 674B, and 676B. The configuration of mask features 670 with transmissive regions 672A, 674A, 676A, 672B, 674B, and 676B (and other transmissive regions not shown) induce three frequencies in the output signal.

In the example embodiment shown, transmissive regions 672A, 674A, 676A, and likewise 672B, 674B, and 676B have a different length L but a same width W in the y-direction. FIG. 6B illustrates objects 605A, 605B, and 605C traveling in the x-direction about to pass adjacent the spatial filter 626. As shown in FIG. 6B, objects 605A, 605B, and 605C have differing widths W, lengths L, and intensities of emitted light, as well as differing locations within the flow channel relative to transmissive regions 672A, 674A, 676A, 672B, 674B, and 676B.

Figure 6C:
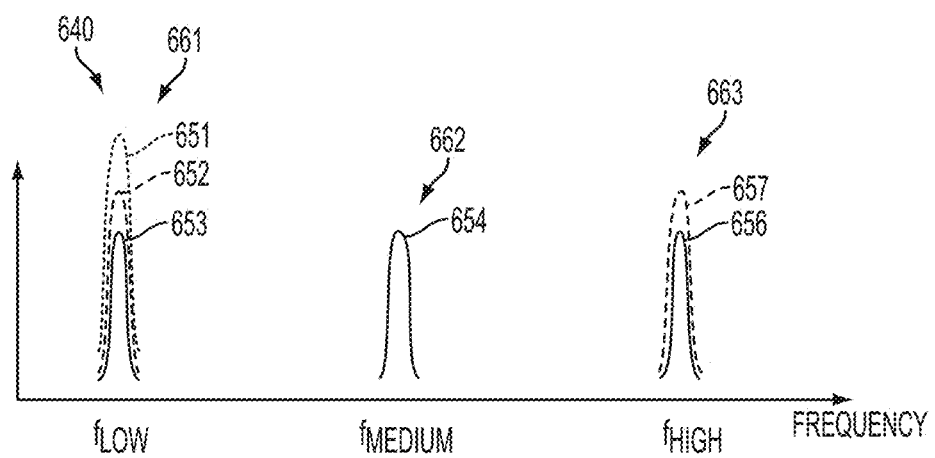
FIG. 6C is a plot of the frequencies that result from light modulated by the spatial filter of FIG. 6A.

FIG. 6C is a simplified plot 640 of the amplitudes of the electrical signals converted to the frequency domain. The signals result from the modulated light that has passed through the mask features 670 of the spatial filter 626 of FIGS. 6A and 6B. The frequency domain includes signal components 651, 652, 653, 654, 656 and 657 at three frequencies 661, 662, and 663 that result from objects 605A, 605B, and 605C traveling relative to the transmissive regions 672A, 674A, 676A, 672B, 674B, and 676B.

Signal component 651 is at a lower frequency 661 and is the result of object 605B, which has higher relative intensity in transmissive region 672A. Similarly, signal component 652 is at the lower frequency 661 and is the result of object 605C, which has an intermediate relative intensity in transmissive region 672B. Signal component 653 is at the lower frequency 661 and is the result of object 605A, which has a lower relative intensity in transmissive regions 672A and 672B. Additionally, signal component 654 is at intermediate frequency 662 and is the result of object 605A, which has a lower relative intensity in transmissive region 676A. Plot 640 also includes signal component 657 that is at the higher frequency 663. Signal component 657 is at the high frequency 663 and is the result of object 605C, which has the intermediate relative intensity in transmissive region 674B. Signal component 656 is at the higher frequency 663 and is the result of object 605A, which has a lower relative intensity in transmissive region 676A. Thus, the simplified plot 640 illustrates that the configuration of the mask features 670 produces signal components 651, 652, 653, 654, 656 and 657 at three distinct frequencies 661, 662, and 663.

The analyzer can be configured to determine a width of the objects based on a number and/or intensity of frequency components in the frequency domain signal. When object 605B moves along the flow path relative to the spatial filter 626, the light emanating from object 605B produces one frequency component, shown in FIG. 6C as component 651. When object 605C moves along the flow path relative to the spatial filter 626, the light emanating from object 605C produces two frequency components, shown in FIG. 6C as components 652 and 657. When object 605B moves along the flow path relative to the spatial filter 626, the light emanating from object 605B produces three frequency components, shown in FIG. 6C as components 653, 654, 656. Thus, the analyzer can be configured to count the number of frequency components in the frequency domain signal to determine object width range (e.g., small, medium or large). The intensity of the frequency components at $f_{low}$, $f_{medium}$, and $f_{high}$ can be used to identify the number of objects in the flow path. For example, the analyzer can analyze the intensities of the frequency components in the frequency domain signal 640 to determine that there are three objects in the flow path, when the objects are distinctly separated in time.

In other embodiments, spatial filter 626 can be configured to induce more or less than three frequencies as desired. For example, the number of induced frequencies can comprise between 3 and 7 frequencies in some embodiments.

In some implementations, the mask features of a spatial filter may be arranged to be useful for determining both the object width along the lateral axis (y-axis) of the flow path and for determining the object length along the longitudinal axis (x-axis and flow direction) of the flow path. As previously discussed in connection with FIGS. 5A-5C, in some embodiments, the spatial filter can include a first group of mask features that are useful to measure object width and a second group of mask features that are useful to measure length. For example, in some embodiments, the first and second groups of features are concatenated along the longitudinal axis of the spatial filter such the that the first group of mask features (used to determine object width) is disposed along a first portion of the spatial filter and the second group of mask features (used to determine object length) is disposed along a second portion of the spatial filter. In other embodiments the first and second groups may be arranged laterally across a width of the spatial filter. For example, the first group of features used for determining object width may be arranged in a central portion along the lateral width of the spatial filter with features used for determining object length arranged in portions of the spatial filter towards the lateral edges of the filter.

For measurement of length, two cases may be considered, a) the minimum feature length of the spatial filter is longer than the length of the objects, and b) the minimum feature size of the spatial filter is shorter than the length of the objects.

Figure 7A:
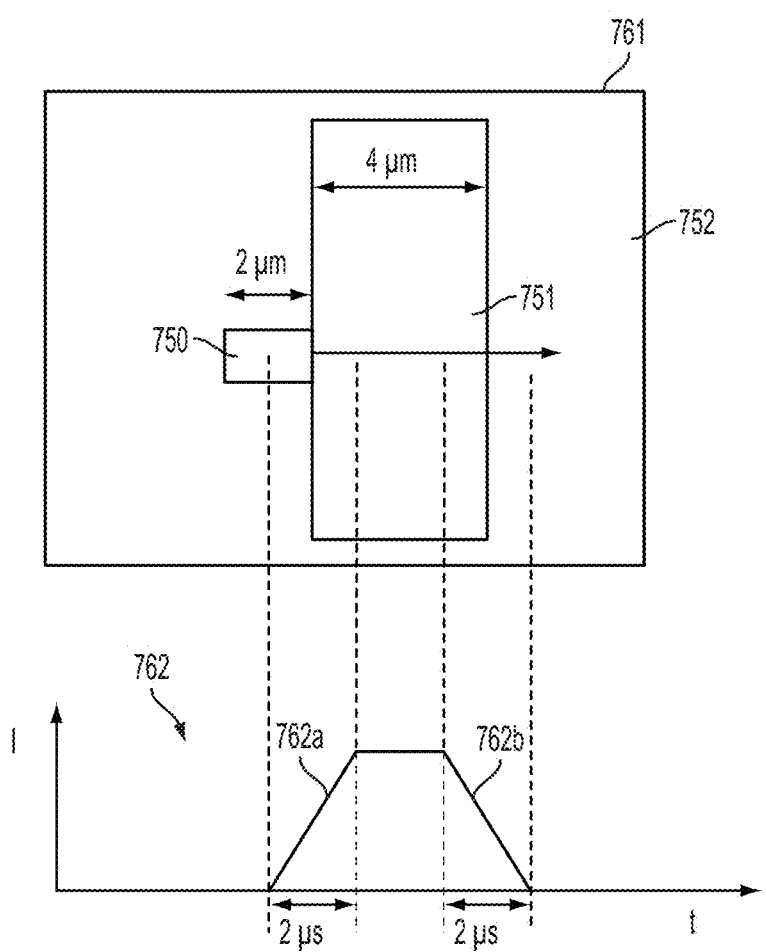
FIG. 7A illustrates the an intensity vs. time pulse for an object traversing a mask feature when the object length is smaller than the mask feature length.

A scenario wherein the minimum feature length of the spatial filter is longer than the length of the objects is exemplified by a 1 mm long periodic spatial filter that has 25 mask features that are more light transmissive, e.g., transparent features alternating with less light transmissive features of same feature length, each feature being 20 µm in length. The objects of interest in this example do not exceed 15 µm. The center of an object traveling with 1 m/s will therefore pass the transparent feature in 20 µs. Depending on the length of the object, the slopes at the edges of this transition interval vary. A shorter object needs less time to show full intensity through the center of the transparent mask feature compared to a longer object. The upper portion of FIG. 7A illustrates an object 750 at the onset of the object's traverse across a transparent feature 751 of a spatial filter. The lower portion of FIG. 7A is an intensity vs. time graph 762 of the intensity pulse of light emanating from the object 750 as the object 750 traverses the transparent feature 751. The object 750 has a length of 2 µm and travels at 1 m/s, thus, the rise time of the transition 762a from the onset of the object's traverse across the transparent feature 751 until the full intensity is observed is 2 µs. The fall time of transition 762b when the particle is entering the blocking area is also 2 µs. The slopes of the transitions 762a, 762b can be used to determine the length of the object for a rectangular object of uniform width. For varying object shapes such as triangular, circular or elliptical, the instantaneous slope varies over time depending on the object position relative to the mask feature.

The intensity-time graph of a pulse transition may be nonlinear, because objects do not necessarily have the rectangular shape shown in FIG. 7A, but may be oblong or rounded, and, because intensity scales with area causing the transitions to be nonlinear. However, some part of the intensity graph 762 can be linearly approximated. Therefore, the slope of the more linear part of the transition, e.g. around the full width half maximum (FWHM) value, can be used for determination of object length.

Figure 7B:
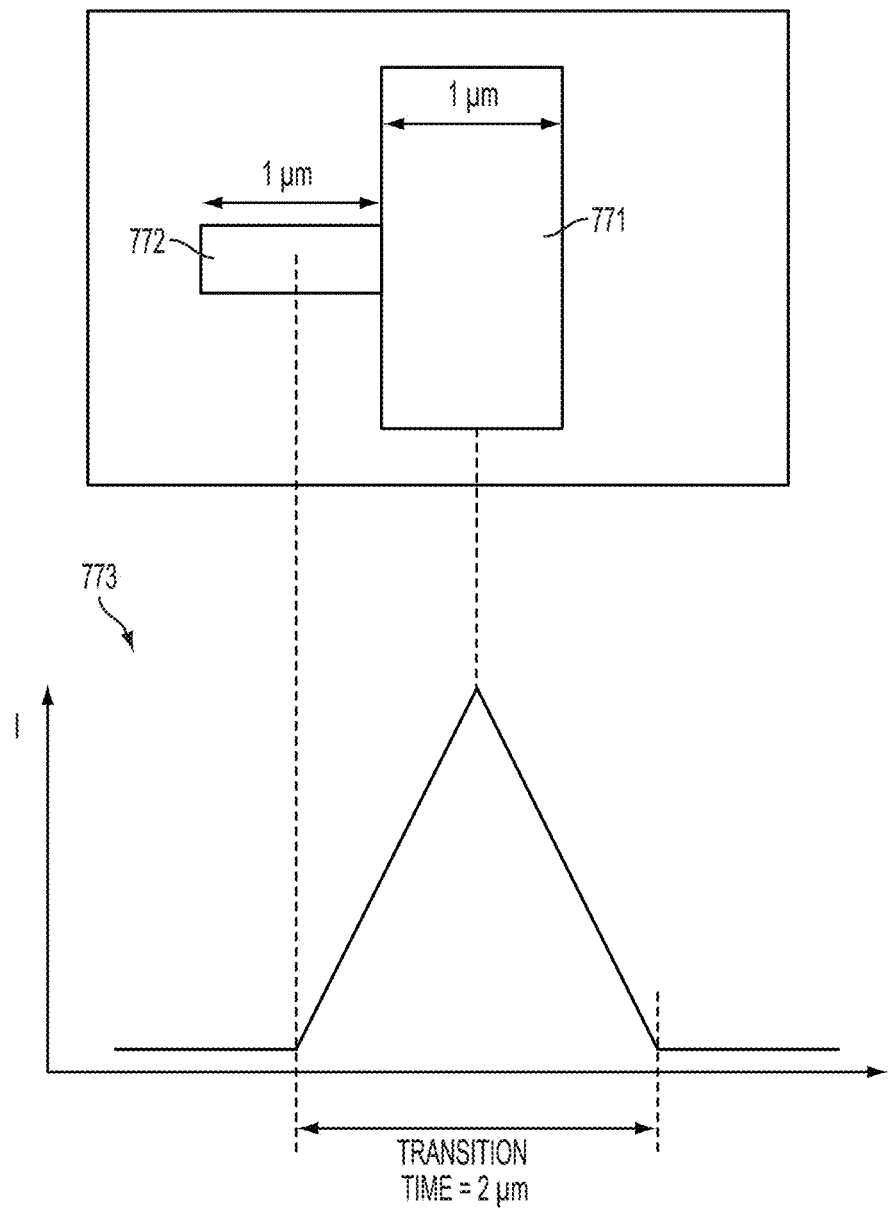
FIG. 7B illustrates the an intensity vs. time pulse for an object traversing a mask feature when the object length greater than or equal to the mask feature length.

If the minimum feature length of the spatial filter is less than or equal to the length of the object, the total length of the intensity pulse as the object traverses a feature depends on the length of object. The upper portion of FIG. 7B illustrates an object 772 at the onset of the object's traverse across a transparent feature 771 of a spatial filter. The lower portion of FIG. 7B is an intensity vs. time graph 773 of the intensity pulse of light emanating from the object 772 as the object 772 traverses the transparent feature 771.

For example, as shown in FIG. 7B, if the transparent mask feature 771 is 1 µm in length, it takes a 1 µm long object (object 772) 2 µs (onset of signal to end) to traverse the feature 771 at 1 m/s. The transition time can be calculated as feature length/object velocity+object length/object velocity.

Determination of signal onset and signal end may be challenging, thus the FWHM distance of onset and end of an intensity peak (or any other ratio between maximum and minimum intensity can be used for determination of object length as a length measure, as can any ratio between maximum and minimum signal intensity. Note that it is helpful if the length of the opaque features between two transparent features is larger than the maximum anticipated object length, because crosstalk between two close transparent features may interfere with the algorithm described above.

If the transparent features of the spatial filter are shorter than an object, the intensity of light emanating from the transparent feature is smaller than the full intensity of the light emanating from the object. The intensity of the emanating light is determined (among other factors) by the length of the transparent feature, but the portion of transmitted light relative to the absolute intensity of the light emanating from the object is determined by the size of the object. This analysis may presume that emission intensity is equally distributed in the object; or that the "object" is defined as the portion of a particle that emits light. For example, if the object is a cell and there is a subcellular component (nucleus, for example) that emits light, then the size in question would be the size of the nucleus and may not be the whole cell. Normally, the intensity of emanating light from the object is unknown. If a spatial mask contains transparent features that are designed to be longer than any object measured in the system, the intensity measured through these features can serve as an intensity reference. If longer and shorter transparent features are both present in the mask, a length determination of objects can be performed based on the intensity ratio associated with the longer and shorter mask feature. The longer mask feature produces a first frequency in the light intensity profile and the shorter mask feature produces a second frequency peak. The superimposed first and second frequency peaks can be used to determine the effective length of an object in the flow direction.

Figure 7C:
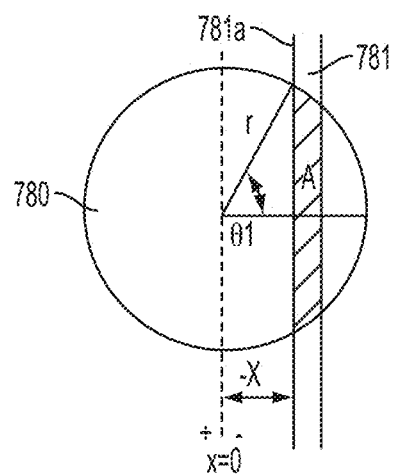
FIGS. 7C and 7D illustrate the light intensity profiles produced by objects with different lengths along the flow direction.
Figure 7D:
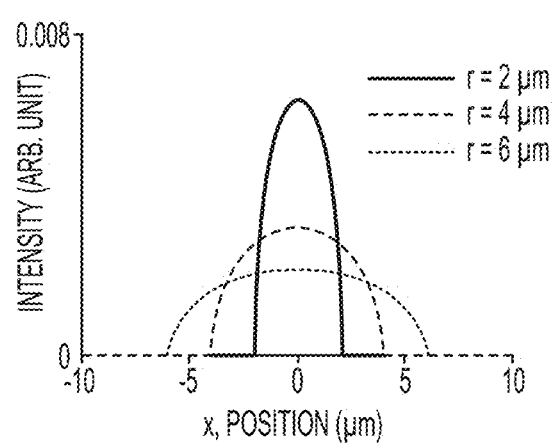

FIGS. 7C and 7D illustrate the light intensity profiles produced by objects with different lengths along the flow direction. FIG. 7C shows an object 780 traversing a transmissive mask feature 781. The object 780 is shown to be longer than the length of the feature, The area A shows the portion of the object that contributes to the intensity profile at the position indicated (the center of the object 780 is at a distance −x from the leading edge 781a of the mask feature 780. Calculated intensity as a function of position x for objects having lengths 2, 4, and 6 μm is shown in the graph of FIG. 7D. This example assumes that the three differently sized objects have the same total intensity, meaning the integral under the curves of 7D would be identical. The peak intensity for smaller particles has to be higher for the integral to be the same.

In some embodiments, the objects can be made to travel at approximately known depth trajectory position in the channel by controlling the fluidic properties prior to the channel inlet (not shown). The length of an object having a known depth travel position in the flow path can be determined using a spatial filter configured to modulate emanating light in such a way that the light intensity includes a first frequency and second frequency superimposed with the first frequency. In some embodiments, sheath flow may be used to confine the objects to a selected depth travel position of the flow path.

Figure 8A:
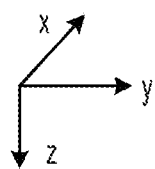
FIG. 8A is a perspective view of a spatial filter having mask features patterned according to another example embodiment.
Figure 8A:
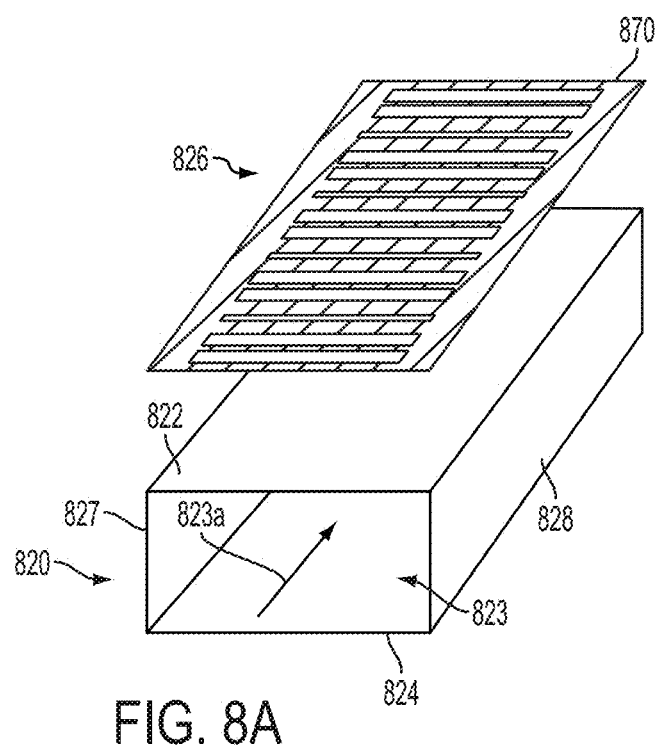

FIG. 8A shows a perspective view of a portion of a fluidic device 820 and a spatial filter 826. The fluidic device 820 includes a flow channel 823 having a flow direction 823a and confining members 822, 824, 827, and 828. Although the confining members 822, 824, 827, and 828 are positioned to define the flow channel 823, in other embodiments, one or all of the confining members 822, 824, 827, and 828 may not be used. The flow direction 823a aligns generally with the x-direction of the Cartesian coordinate system illustrated in FIG. 8A. In the embodiment shown, the spatial filter 826 is disposed at a distance from the confining member 822. In other embodiments, the spatial filter 826 may be disposed within the flow channel 823, mounted to any of the confining members 822, 824, 827, and 828, or positioned relative to any of the confining members 822, 824, 827, and 828. A detector (not shown) may be positioned in any appropriate location to sense modulated light passing through the filter 826.

Figure 8B:
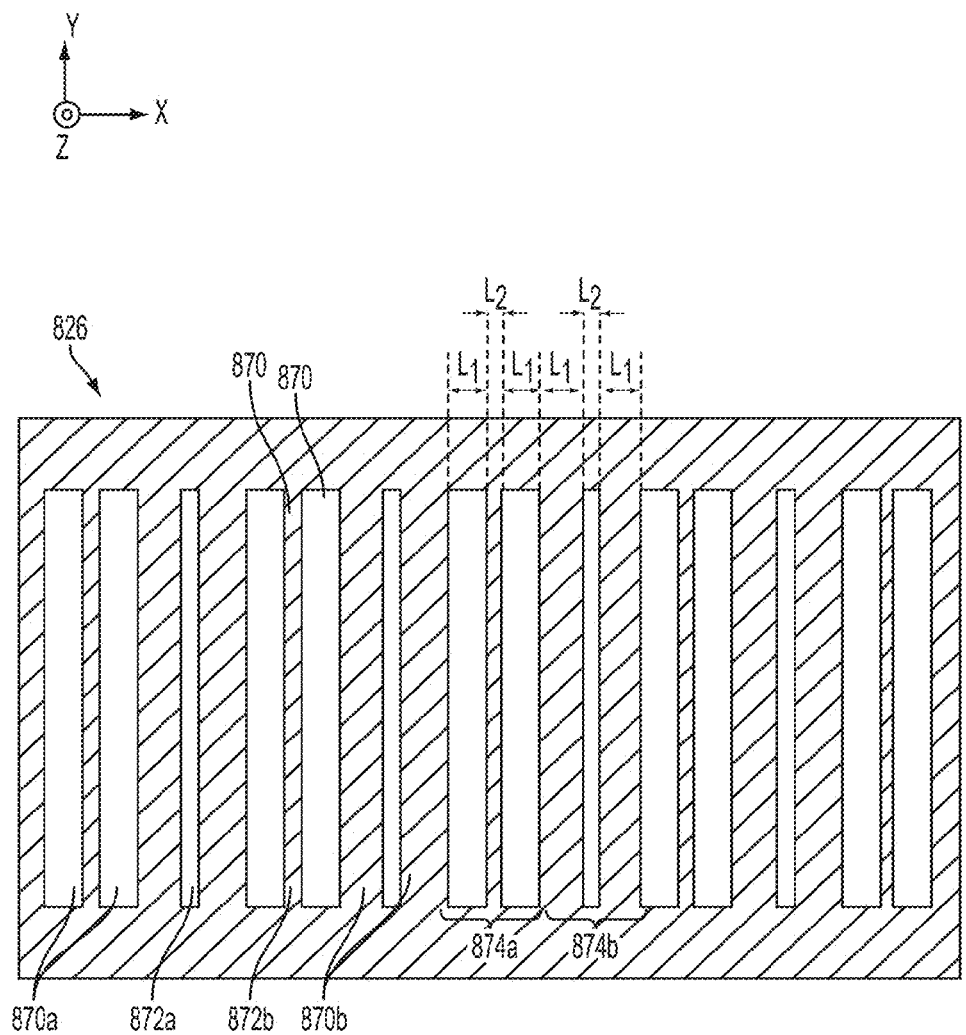
FIG. 8B is an enlargement of the spatial filter of FIG. 8A.

In FIG. 8A, the spatial filter 826 is arranged in the x-y plane of the Cartesian coordinate system. The spatial filter 826 has a plurality of mask features 870 arranged in a desired pattern. In particular, the mask features 870 have repeating periodic patterns in the x-direction and extend a same distance in the y-direction. Additionally, as shown in FIGS. 8B and 8D, each of the mask features 870 has a length of either $L_1$ or $L_2$ in the x-direction. The lengths $L_1$ and $L_2$ remain constant as the mask features 870 extend laterally across a width of the spatial filter 826. In some embodiments, the ratio of the lengths $L_1$ to $L_2$ is between 9:3 and 10:1. However, the ratio of the lengths $L_1$ to $L_2$ may vary depending upon design and other criteria including, for example, object size, object velocity, and ease of signal processing.

FIG. 8B is a planar view of an enlarged portion of the spatial filter 826 of FIG. 8A illustrating the mask features 870 in greater detail. Mask features 870 include transmissive regions 870a and 872a. In the embodiment shown, the transmissive regions 870a have lengths $L_1$ in the x-direction while the transmissive regions 872a have lengths $L_2$ in the x-direction. Similarly, the mask features 870 include less-transmissive regions 870b and 872b. In the embodiment shown, the less-transmissive regions 870b have lengths $L_1$ in the x-direction while the less-transmissive regions 872b have lengths $L_2$ in the x-direction.

In FIG. 8B, the mask features 870 alternate between first and second sets of features 874a, 874b in the x-direction. The first and second sets of features 874a, 874b provide for two different components to the modulated light (and the electrical signal of the detector) as will be discussed subsequently. The first set of features 874a is comprised of two of the transmissive regions 870a arranged to either side of a single one of the less-transmissive regions 872b. The second set of features 874b is comprised of two of the less-transmissive regions 870b arranged to either side of a single one of the transmissive regions 872a.

Figure 8C:
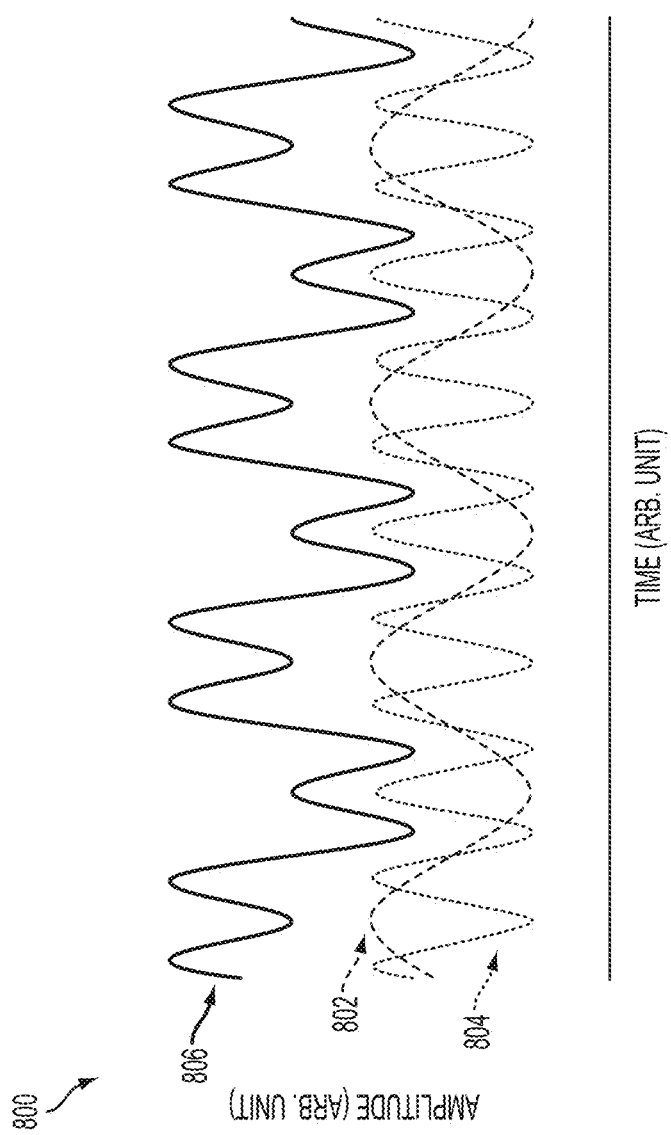
FIG. 8C is a simplified plot of the output signals that result from light modulated by the spatial filter of FIG. 8A.
Figure 8D:
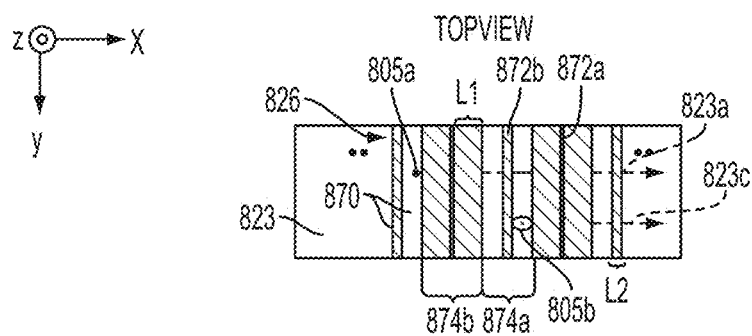
FIG. 8D is a top view of the spatial filter of FIG. 8A disposed over a flow channel containing two light emanating objects having different length dimensions.

FIG. 8C is a simplified plot 800 of the electrical signals generated in response to the modulated light that has passed through the mask features 870 of the spatial filter 826 of FIGS. 8A and 8B. The simplified plot 800 illustrates that the configuration of the mask features 870 produces first and second signal components 802 and 804 that are superimposed in the resulting time domain electrical signal 806.

In FIG. 8C, first and second signal components 802 and 804 both have a sinusoidal pattern. The first sinusoidal signal component 802 results from the transmissive regions 870a (FIG. 8B) and the corresponding less-transmissive regions 870b (FIG. 8B) while the second signal component 804 results from the transmissive regions 872a (FIG. 8B) and the corresponding less-transmissive regions 872b (FIG. 8B).

The electrical signal 806 is the sum of the first signal component 802 having a first frequency and the second signal component 804 having a second frequency and is the result of alternating the first set of features 874a (FIG. 8B) with the second set of features 874b (FIG. 8B). In the embodiment shown in FIG. 8C, the first frequency differs from the second frequency. In some embodiments, the second frequency may be a multiple of the first frequency. An analyzer, such as analyzer 150 (FIG. 1), may be configured to compare an amplitude of the first signal component 802 with an amplitude of the second signal component 804 to determine the length of the object in the flow channel 823. The analyzer may be configured to determine the length of the object in the flow channel 823 based on an amount of disparity between the amplitude of the first signal component 802 and the amplitude of the second signal component 804.

FIG. 8D shows a top planar view of the filter 826 design of FIGS. 8A and 8B used in an exemplary application to determine the lengths (among other characteristics) of objects 805a and 805b. In FIG. 8D, the objects 805a and 805b are moving within a flow channel 823 in a flow direction 823a relative to the spatial filter 826. In this embodiment, the detector (not shown) would be positioned above the filter 826 to sense light emanating from the objects that interact with the filter 826. Thus, the objects 805a and 805b travel below the features 870 comprised of the first set of features 874a and the second set of features 874b.

Figure 8E:
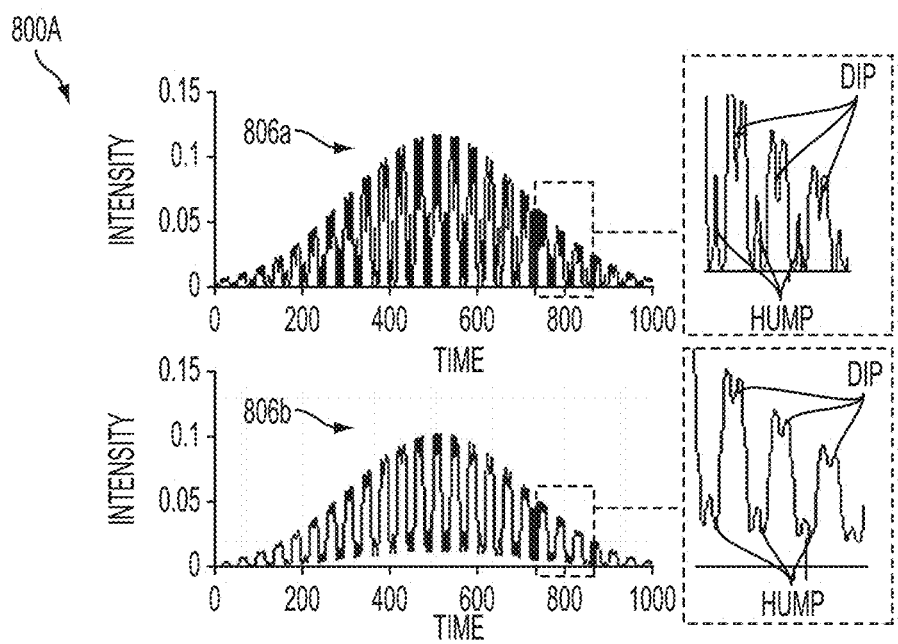
FIG. 8E are plots of the time-varying electrical signals generated in response to the modulated light from each of the two objects moving relative to the spatial filter of FIG. 8D.

FIG. 8E shows plots 800A of the time-varying electrical signals 806a and 806b generated in response to the modulated light sensed from each of the objects 805a and 805b moving relative to the spatial filter. Object 805a has a smaller length in the x-direction relative to object 805b.

Signal 806a corresponds to sensed light from object 805a while signal 806b corresponds to sensed light object 805b. As shown in the enlargement of the signal 806a in FIG. 8E, the signal 806a includes "dips" in the peak region and "humps" in the trough region. Similarly, the signal 806b includes "dips" in the peak region and "humps" in the trough region. The dips correspond to the less-transmissive regions 872b within the first set of features 874a and the humps correspond to the transmissive regions 872a within the second set of feature 874b.

The signal 806a has an intensity profile with shorter transition times between peak regions and trough regions and is more sensitive to the transmissive regions 872a and the less-transmissive regions 872b since more emanating light from object 805a is transmitted or blocked by the regions 872a and 872b than emanating light from object 805b. This phenomenon results in a larger dip in the middle of peaks and hump in the middle of trough of signal 806a relative to signal 806b.

For each signal 806a and 806b, an analyzer may be configured to determine the amplitudes of the dips and/or humps and to determine the amplitude of the peak regions and the trough regions. The analyzer then compares the amplitude of the dips and/or humps to the amplitude of the peak region and/or trough region to determine the length of the object 805a and 805b in the flow channel 823. This determination is informed by mask features 870, which have a known size and pattern. Thus, the output signals 806a and/or 806b may be correlated with the known mask pattern to allow for extraction of desired information including the length of the object. The determination of the length of the object may additionally be informed by, for example, comparing characteristics of the output signals 806a and/or 806b to reference output signals with known object light intensity, velocity, object size (i.e. length), and/or known object travel trajectory depth within the flow channel.

Figure 8F:
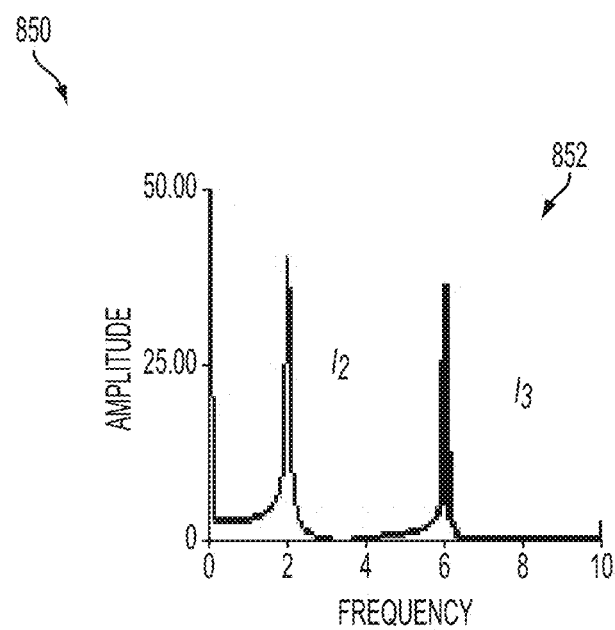
FIG. 8F is a plot of the amplitudes of the electrical signals from FIG. 8E converted to the frequency domain.
Figure 8F:
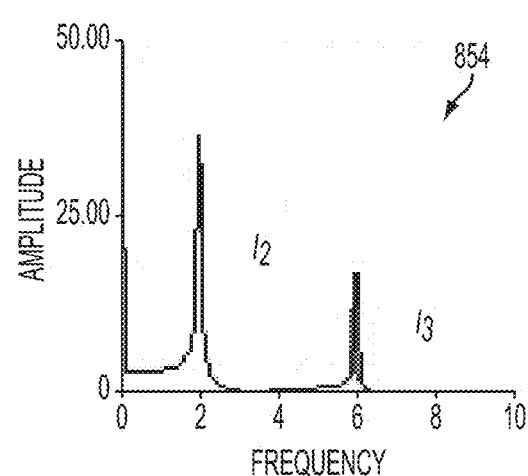

FIG. 8F shows plots 850 of the amplitudes of the electrical signals 806a and 806b converted to the frequency domain. Plot 852 corresponds to signal 806a for object 805a while plot 854 corresponds to the signal 806b for object 805b. Intensity peak $I_2$ corresponds to the amplitude of the peak and trough regions of the output signal and result from the transmissive regions 870a (FIG. 8B) and the less-transmissive regions 870b (FIG. 8B) of the filter 826. Intensity peak $I_3$ corresponds to the amplitude of the humps and dips that result from the transmissive regions 872a (FIGS. 8B and 8D) and the less-transmissive regions 872b (FIG. 8B) of the filter 826. As shown in plots 850, the intensity peak $I_3$ of plot 852 is larger than the intensity peak $I_3$ of plot 854 due to the much larger dips/humps in signal 806a. Utilizing the frequency domain analysis including intensity peaks $I_2$ and $I_3$ can aid in the determination of the length of the object. For example, analysis using the intensity peaks $I_2$ and $I_3$ allows for a less complicated comparison of the amplitude of the peak and/or trough regions with the amplitude of the humps and/or dips.

Figure 9:
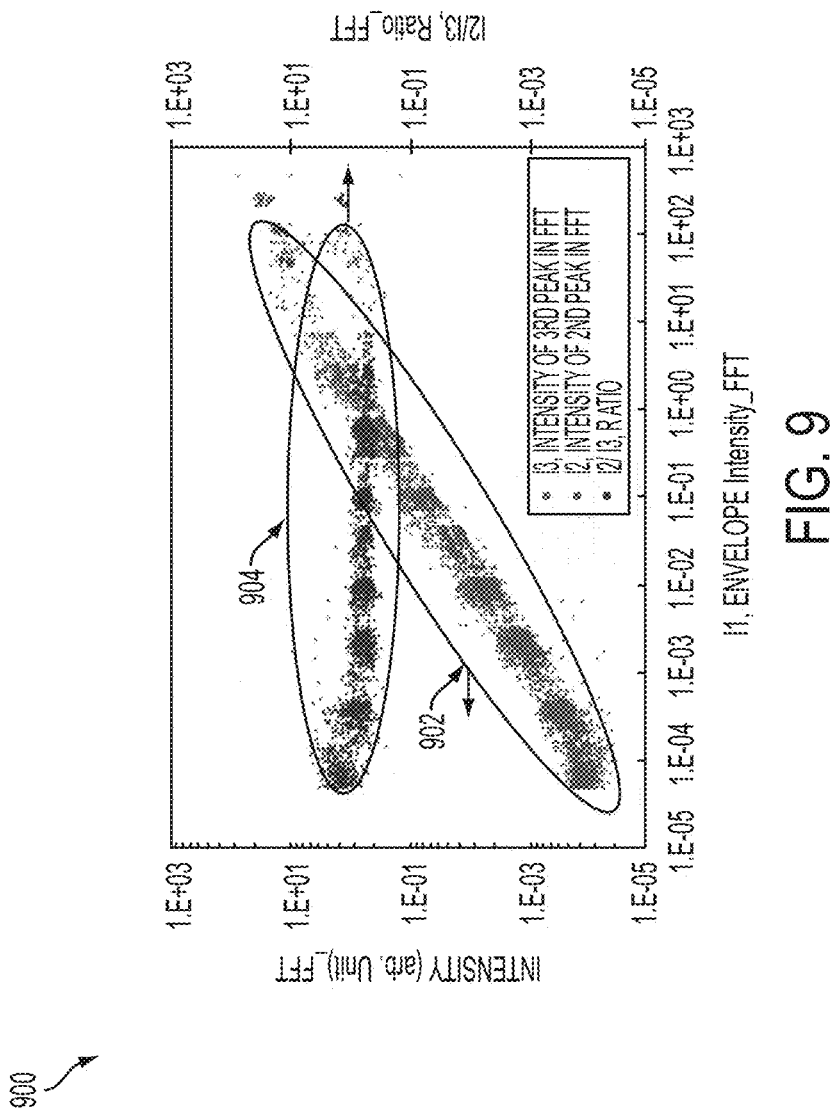
FIG. 9 illustrates $I_2/I_3$ intensity peak ratio plotted against an intensity and an envelope intensity for an object.
Figure 10A:
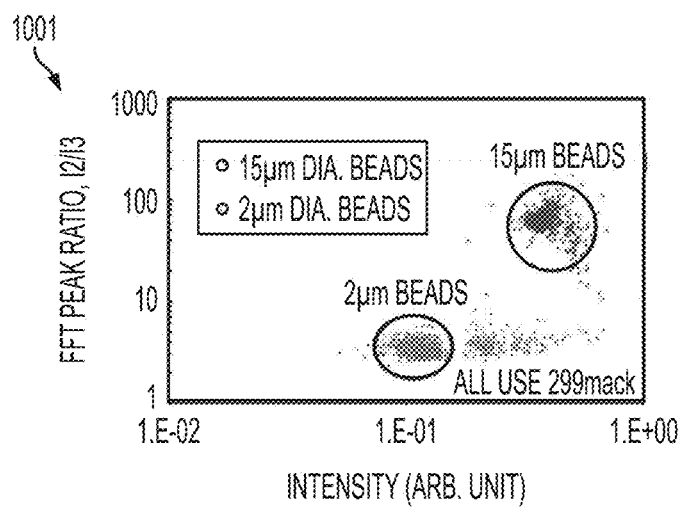
FIGS. 10A and 10B illustrate two plots of objects having different diameters identified using $I_2/I_3$ intensity peak ratio.
Figure 10B:
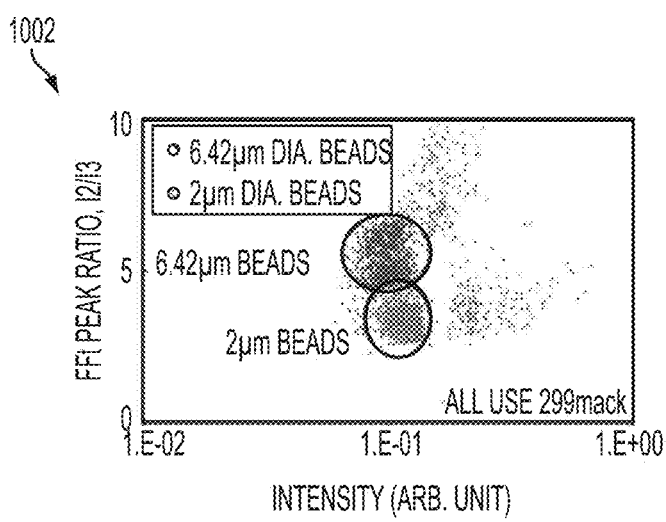
Figure 11:
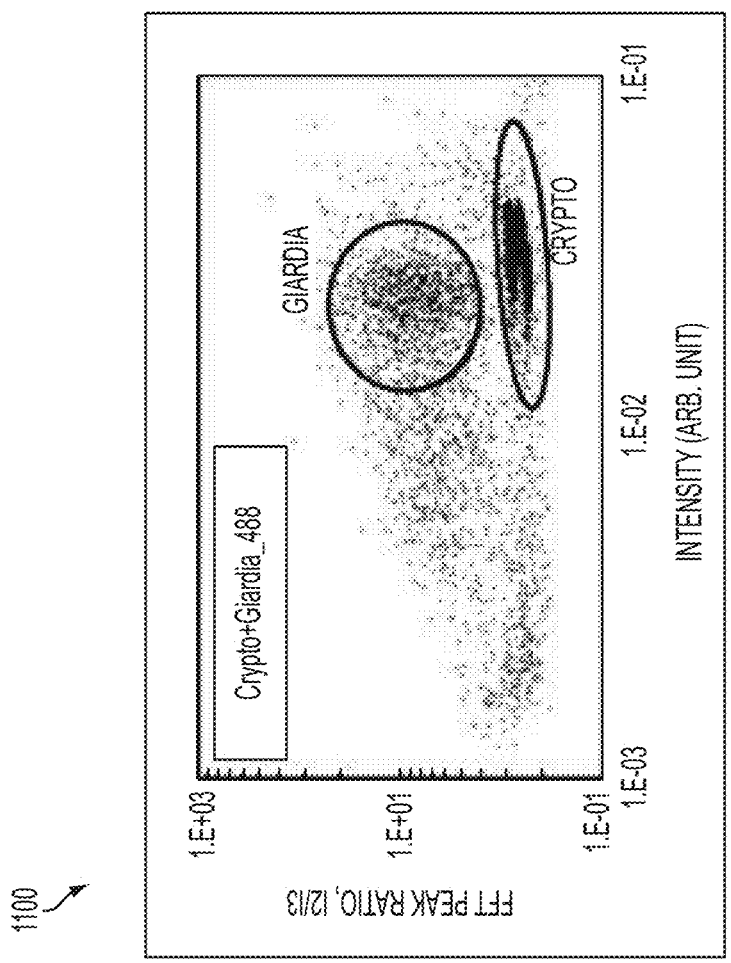
FIG. 11 is a plot of *Giardia* and *Cryptosporidium* particles identified from one another using $I_2/I_3$ intensity peak ratio.

Analysis of the length of the object can be performed using a ratio of the intensity peak $I_2$ relative to the intensity peak $I_3$ as illustrated in the plots 900, 1001, 1002 and 1100 of FIGS. 9, 10, and 11, respectively. Plot 900 illustrates $I_2/I_3$ intensity peaks that result from a measurement using 3 um Spherotech RCP-50A bead sample that contains beads with eight different fluorescent deye concentrations resulting in eight different fluorescence intensities. Analysis was performed with the spatial filter 826 of FIGS. 8A, 8B, and 8D. FFT analysis shows that the both I2 and I3 groups 902 increase almost equally with intensity, which leads to a "constant ratio" (i.e. $I_2/I_3$ 904) at all eight intensities. In systems calibrated with objects of known lengths, the constant ratio $I_2/I_3$ 904 is particularly useful as a measure of object length since it is robust to particle intensity variation between objects. The object travel trajectory depth within the flow channel does not influence this ratio if the signal is detected with a low numerical aperture (NA) detection optics of high depth of focus. Another way of ensuring a high depth of focus is by using a remote sensing configuration, using a lens to project a magnified image of the light emitted from the channel onto the detection mask.

Plots 1001 of FIG. 10A and 1002 of FIG. 10B illustrate the effectiveness of determining object length using the ratio $I_2/I_3$ using the spatial filter 826 of FIGS. 8A, 8B, and 8D. In particular, the spatial filter 826 was used to separately analyze beads having a known length. In particular, beads of 2 μm, 6.42 μm, and 15 μm were analyzed as shown in FIGS. 10A and 10B. The 2 μm and 15 μm beads can be differentiated by using the ratio $I_2/I_3$ in FIG. 10A. It was also demonstrated that it is possible to differentiate the 2 μm and 15 μm beads by using intensity in time domain, the 15 um beads being substantially brighter than 2 um beads. Plot 1002 of FIG. 10B shows the 6.42 um and 2 um beads can be differentiated by using the ratio $I_2/I_3$ but not by using intensity as both 6.42 um and 2 um beads have greatly overlapping values along the x-axis of the plot 1002.

FIG. 11 shows a plot 1100 of the ratio $I_2/I_3$ analysis applied to dimmer particles, *Giardia* and *Cryptosporidium* stained with Giardi-AG10 and Crypt-A-Glo. *Giardia* and *Cryptosporidium* were measured and show two clear groups of ratio $I_2/I_3$. The results of the experiments illustrates that dimmer objects such as *Giardia* and *Cryptosporidium* can be discriminated using the ratio $I_2/I_3$ technique described above.

Figure 12:
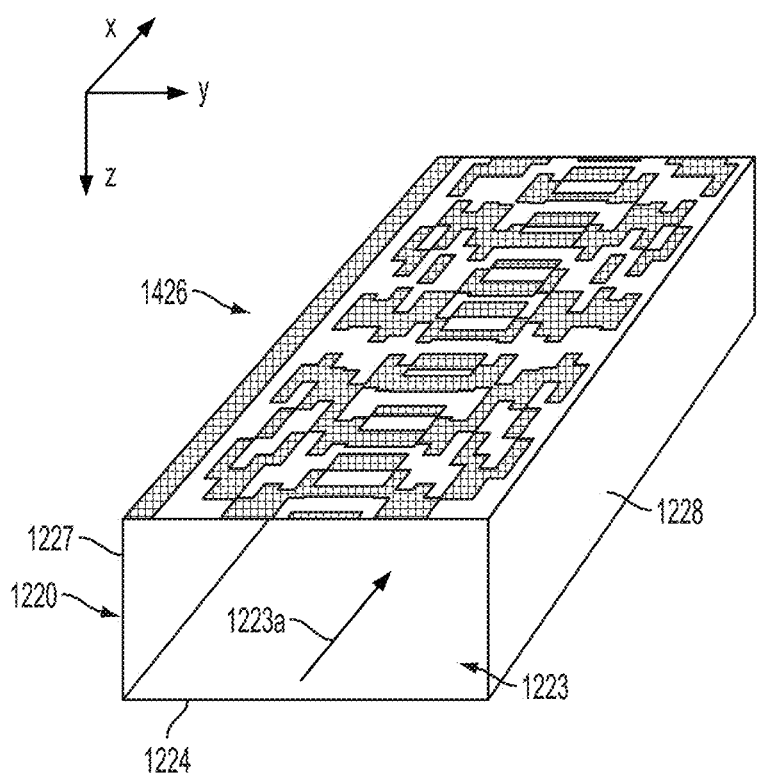
FIG. 12 is a perspective view of another spatial filter disposed in the x-y plane and having mask features patterned according to another example embodiment to allow for determination of both a width and length of an object.
Figure 13:
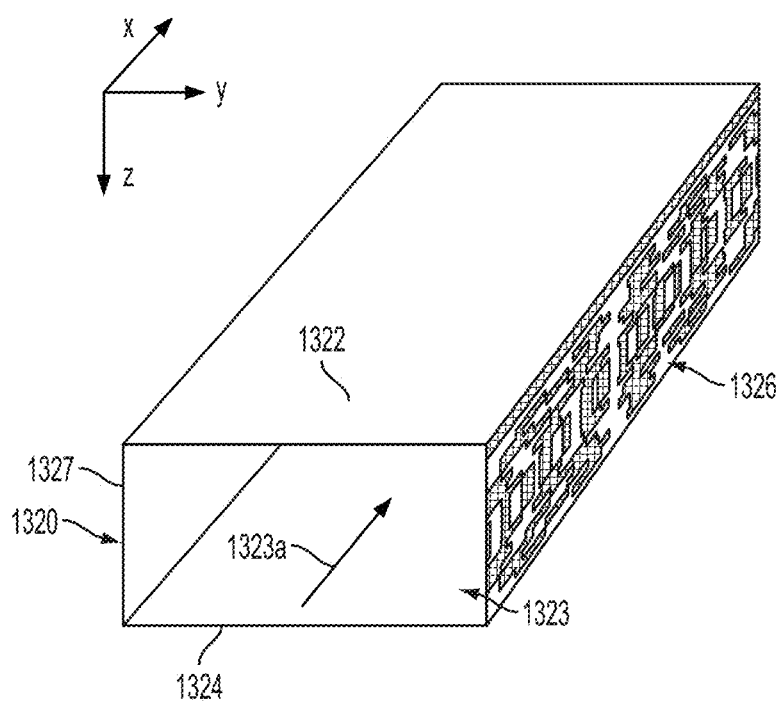
FIG. 13 a perspective view of the spatial filter of FIG. 12 disposed in the x-z plane and having mask features patterned to allow for determination of both a thickness and length of an object.

FIGS. 12-13 illustrate a spatial filter 1426 having the general configuration illustrated by spatial filter 502 of FIG. 5B. In this embodiment, mask features used for determining object length are disposed along a laterally central portion of the spatial filter. Portions of the spatial filter that include mask features that can be used to determine object width are disposed on either side of the central portion.

FIG. 12 shows a perspective view of a portion of a fluidic device 1220 and an embodiment of a spatial filter 1426 capable of allowing for the determination of both object length and width. In some embodiments, the length and width determination may be made simultaneously. The fluidic device 1220 includes a flow channel 1223 having a flow direction 1223a, and confining members 1224, 1227, and 1228. The confining members 1224, 1227, and 1228 are positioned to define the flow channel 1223. The flow direction 1223a aligns generally with the x-direction of the Cartesian coordinate system illustrated in FIG. 12. In the embodiment shown, the spatial filter 1426 is mounted along a confining member (not shown) that extends generally along the x-y plane. In other embodiments, the spatial filter 1426 may be disposed externally to or within the flow channel 1223, and/or positioned relative to any of the other illustrated confining members 1224, 1227, and 1228. A detector or multiple detectors (not shown) may be positioned in any appropriate location to sense modulated light passing through the filter 1426. For example, first and second spatial filters may be arranged along multiple planes, e.g., such as by using both spatial filters shown in FIGS. 12 and 13 together. In this example, a first detector may be positioned to sense light modulated by the first spatial filter 1426 and a second detector may be positioned to sense light modulated by the second spatial filter 1326. In this configuration, a first signal generated by the first detector is used to determine object width along the y-axis and a second signal generated by the second detector is used to determine object thickness along the z-axis.

For example, for a fluidic device 1220 and spatial filter 1426 having the orientation of FIG. 12, an excitation light source (also not shown in FIG. 12) can be oriented below confining member 1224 and a detector (not shown in FIG. 12) can be oriented above the filter 1426. In such an arrangement, excitation light from the light source passes through confining member 1224 and optically interacts with objects traveling within the flow channel 1223. The excitation light causes the objects to emanate light in all directions and a portion of the emanating light from the objects is spatially modulated by filter 1426. A detector positioned above the spatial filter senses the spatially modulated light and, in response, generates a time varying signal.

Similar to the embodiment of FIG. 12, the embodiment of FIG. 13 illustrates a portion of a fluidic device 1320 and a spatial filter 1326 capable of allowing for the determination of both object length and a thickness of the object along the z direction simultaneously. The fluidic device 1320 includes a flow channel 1323 having a flow direction 1323a, confining members 1322, 1324, and 1327. The confining members 1322, 1324, and 1327 are positioned to define the flow channel 1323. The flow direction 1323a aligns generally with the x-direction of the Cartesian coordinate system illustrated in FIG. 13. In the embodiment shown, the spatial filter 1326 is mounted along a confining member (not shown) that extends generally along the x-z plane, although the spatial filter need not lie strictly in the x-z plane and could be slightly angled with respect to the flow channel.

For example, for a fluidic device 1320 and spatial filter 1326 having the orientation of FIG. 13, an excitation light source (also not shown in FIG. 13) can be oriented below confining member 1324 and a detector (not shown in FIG. 13) can be oriented to the right of the filter 1326. In such an arrangement, excitation light from the light source passes through confining member 1324 and optically interacts with objects traveling within the flow channel 1323. The excitation light causes the objects to emanate light in all directions and a portion of the emanating light from the objects is spatially modulated by filter 1326. The detector, positioned so that the detector can detect light propagating predominantly in y-direction through the spatial filter 1326, senses the spatially modulated light and, in response, generates a time varying electrical signal.

In FIG. 12, the spatial filter 1426 is arranged in the x-y plane of the Cartesian coordinate system. The spatial filter 1426 has mask features that allow for determination of both the width and length of the object. The spatial filter 1326 of FIG. 13 is arranged along the x-z plane of the Cartesian coordinate system and has mask features that allow for determination of both the thickness and length of the object. Thus, spatial filters 1426 and/or 1326 allow for determination of the true shape of an object by calculation of an aspect ratio of the object. Aspect ratios of the width to length and thickness to length can easily be obtained.

Although the filters 1426 and 1326 are shown and described in reference to different embodiments, it should be understood that the filters described herein can be used in combination with one another or other filter designs. Thus, multiple filters with various orientations and/or configurations can be used to determine object size and shape including at least one of the width, length, and/or thickness. In alternative to or in addition to the multiple mask configuration, a single filter having multiple different mask feature designs and/or various mask feature orientations can also be used to determine object size and shape.

Figure 14:
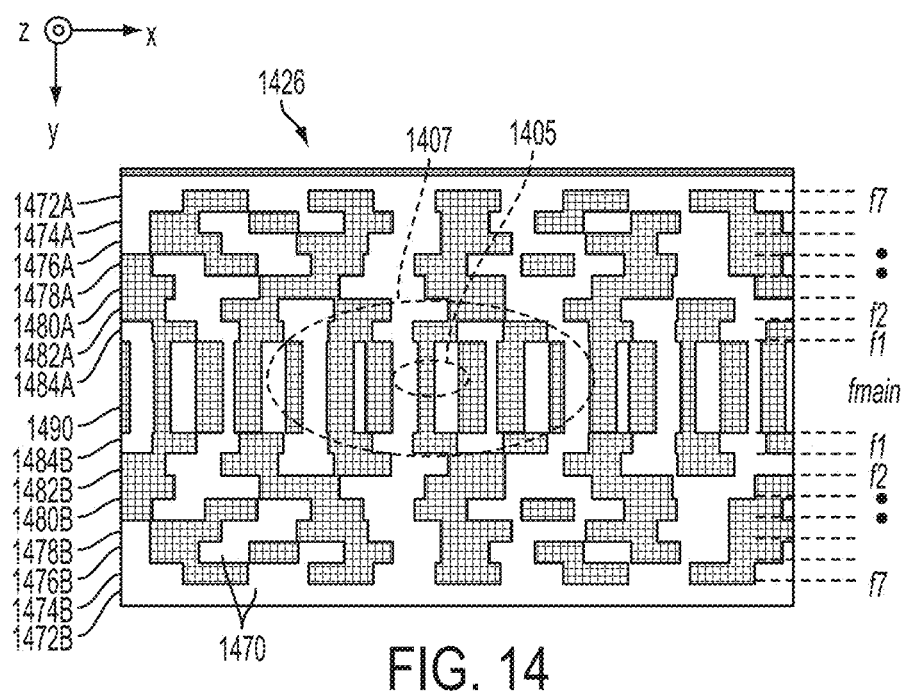
FIG. 14 is a plan view of the spatial filter of FIG. 12 with an object having light emanating therefrom disposed adjacent the filter.

FIG. 14 shows a top plan view of the spatial filter 1426 of FIG. 12 illustrated with an object 1405 having an emission cone 1407. The spatial filter 1426 has mask features 1470 that combine aspects of the spatial filter of FIGS. 6A-6C and aspects of the spatial filter of FIGS. 8A-8F. In particular, the mask features 1470 include transmissive regions 1472A, 1474A, 1476A, 1478A, 1480A, 1482A, 1484A, 1472B, 1474B, 1476B, 1478B, 1480B, 1482B, and 1484B with repeating periodic patterns in the x-direction (sometimes referred to herein as the longitudinal direction) and a differing periodic pattern in a direction perpendicular thereto (i.e. the y-direction). Transmissive regions 1472A, 1474A, 1476A, 1478A, 1480A, 1482A, 1484A, 1472B, 1474B, 1476B, 1478B, 1480B, 1482B, and 1484B induce seven frequencies in the output signal that can be used to determine the object width (or thickness with respect to the spatial filter 1326 of FIG. 13).

The mask features 1470 also include aspects of spatial filter 826 (FIGS. 8A-8F) as transmission region 1490. Mask 1490 is disposed laterally between transmissive regions 1472A, 1474A, 1476A, 1478A, 1480A, 1482A, 1484A and transmissive regions 1472B, 1474B, 1476B, 1478B, 1480B, 1482B, and 1484B. Mask features 1490 allow for determination of object length as discussed in reference to FIGS. 8A-8F.

Figure 15:
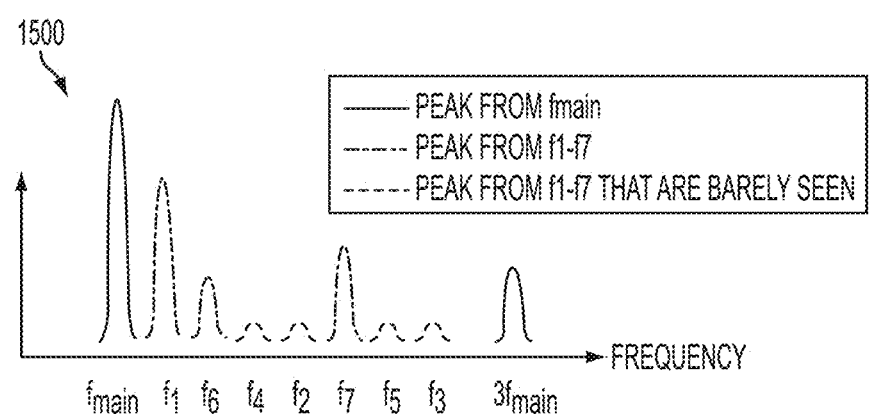
FIG. 15 is a plot of the frequencies that result from light modulated by the spatial filter of FIG. 14.

FIG. 15 is a simplified plot 1500 of the amplitudes of the electrical signals converted to the frequency domain, e.g., by a Fourier transform or FFT. The signals result from the modulated light that has passed through the mask features 1470 of the spatial filter 1426 of FIG. 14. As illustrated, the frequency domain includes signal components at seven frequencies for determining width and two frequencies for determining length that result from object 1405 traveling relative to the transmissive regions 1472A, 1474A, 1476A, 1478A, 1480A, 1482A, 1484A, 1472B, 1474B, 1476B, 1478B, 1480B, 1482B, 1484B and 1490. The wider a particle is the more frequencies f1, f2, etc. occur in the FFT transform.

Figure 16:
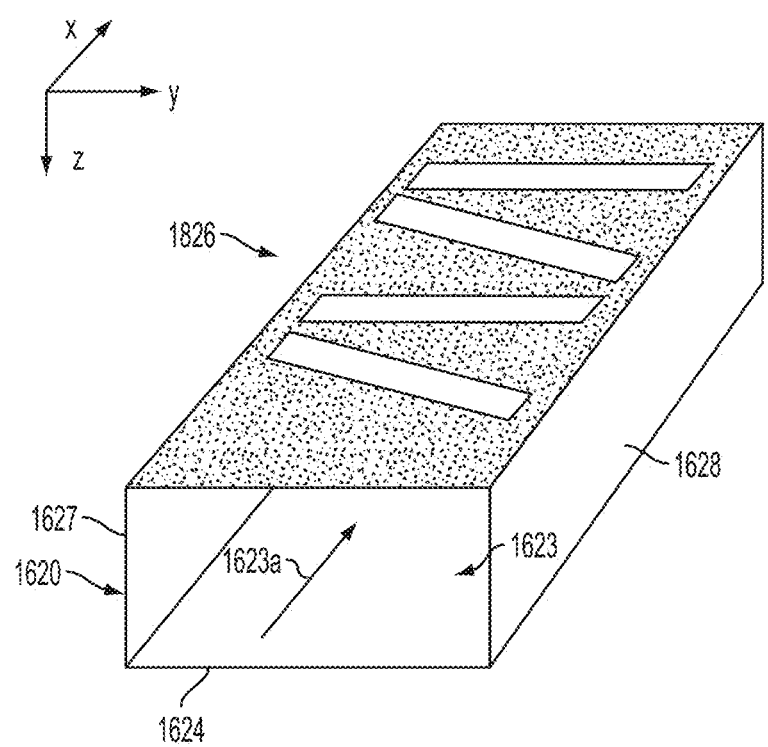
FIG. 16 is a perspective view of another spatial filter disposed in the x-y plane and having mask features with a vertical and diagonal orientation according to yet another example embodiment to allow for determination of a width of an object passing through the flow channel.

FIG. 16 shows a perspective view of a portion of a fluidic device 1620 and another embodiment of a spatial filter 1826 that can be used for determining the width and length of an object. The fluidic device 1620 includes a flow channel 1623 having a flow direction 1623a, and confining members 1624, 1627, and 1628. The confining members 1624, 1627, and 1628 are positioned to define the flow channel 1623. The flow direction 1623a aligns generally with the x-direction of the Cartesian coordinate system illustrated in FIG. 16. In the embodiment shown, the spatial filter 1826 is mounted along a confining member (not shown) that extends generally along the x-y plane. In other embodiments, the spatial filter 1826 may be disposed externally to or within the flow channel 1623, and/or positioned relative to any of the illustrated confining members 1624, 1627, and 1628. A detector or multiple detectors (not shown) may be positioned in any appropriate location to sense modulated light passing through the filter 1826.

Figure 17:
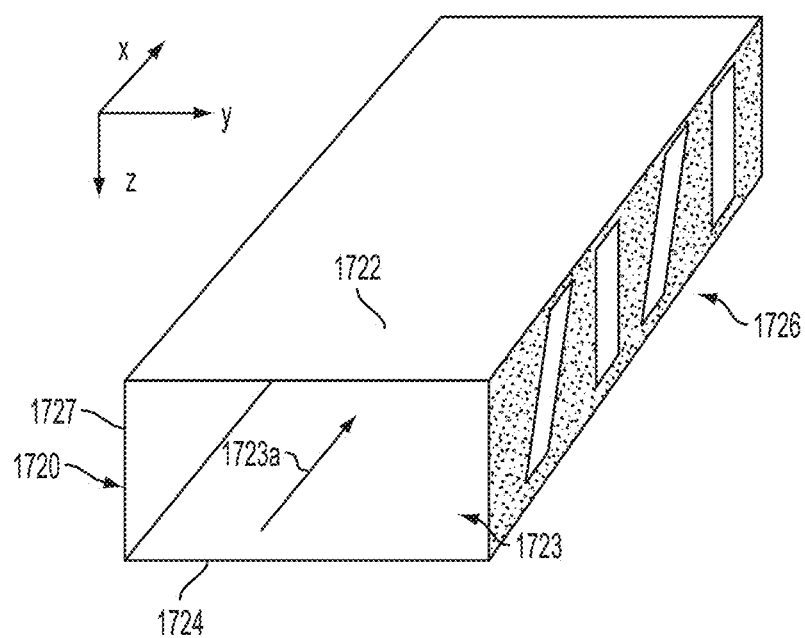
FIG. 17 a perspective view of the spatial filter of FIG. 16 disposed in the x-z plane and having mask features with a vertical and diagonal orientation according to yet another example embodiment to allow for determination of a thickness of an object passing through the flow channel.

Similar to the embodiment of FIG. 16, the embodiment of FIG. 17 illustrates a portion of a fluidic device 1720 and a spatial filter 1726 that can be used for determining the thickness and length of an object. The fluidic device 1720 includes a flow channel 1723 having a flow direction 1723a, confining members 1724, 1726, and 1727. The confining members 1724, 1726, and 1727 are positioned to define the flow channel 1723. The flow direction 1723a aligns generally with the x-direction of the Cartesian coordinate system illustrated in FIG. 17. In the embodiment shown, the spatial filter 1726 is mounted along a confining member (not shown) that extends generally along the x-z plane.

In FIG. 16, the spatial filter 1826 is arranged in the x-y plane of the Cartesian coordinate system. The spatial filter 1826 has mask features that have either a perpendicular orientation relative to the flow direction 1623a or a diagonal orientation relative to the flow direction 1623a to allow for a simultaneous determination of the length and width of the object. The vertical and diagonal orientated features are illustrated as alternating in the embodiments of FIGS. 16 and 17. However, in other embodiments spatial filters with mask features having a first section of vertical transmissive regions and a second section with diagonal transmissive regions may also be used.

The spatial filter 1726 of FIG. 17 is arranged along the x-z plane of the Cartesian coordinate system and mask features that have either a perpendicular orientation relative to the flow direction 1723a or a diagonal orientation relative to the flow direction 1723a to allow for a simultaneous determination of the length and thickness of the object. Although the filters 1826 and 1726 are shown and described in reference to different embodiments, it should be understood that the filters described herein can be used in combination with one another or other filter designs.

Figure 18:
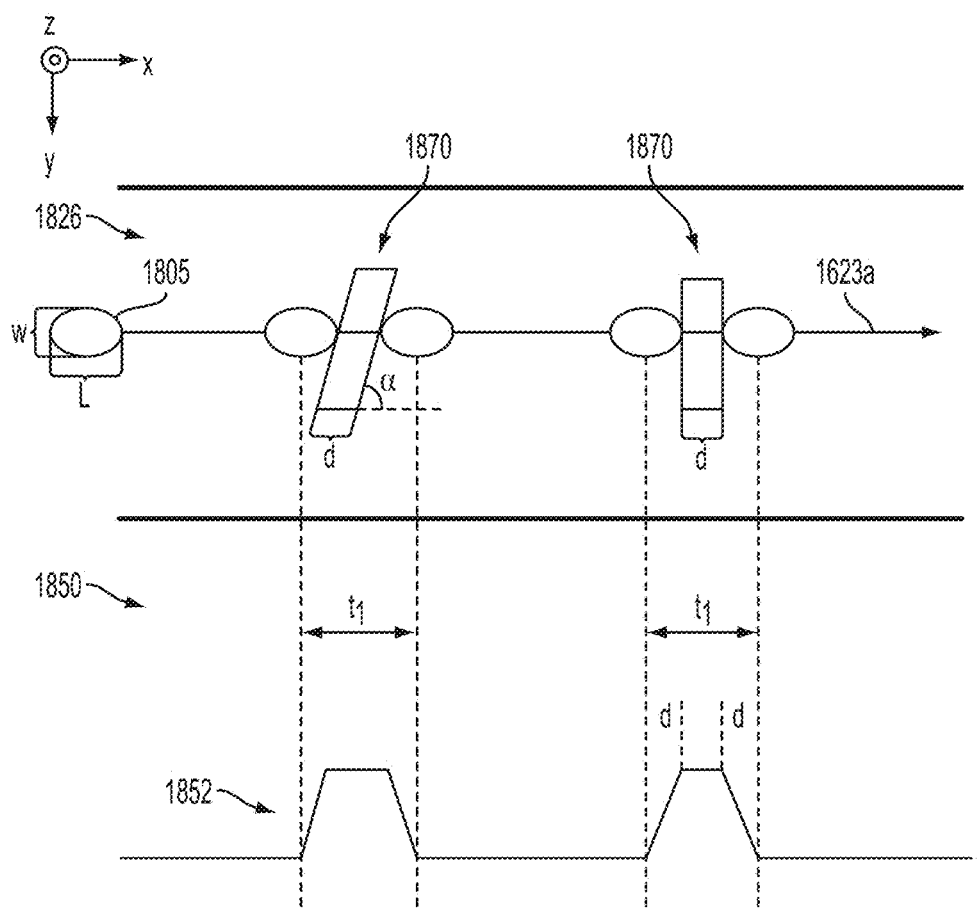
FIG. 18 is a plan view of a portion of the spatial filter from FIGS. 16 and 17 illustrating output signals that result from an object passing adjacent one vertical and one diagonal mask feature of the spatial filter.

FIG. 18 shows a side plan view of a portion the spatial filter 1826 of FIG. 16 illustrated with an object 1805 passing adjacent the portion of the spatial filter 1826 in the flow direction 1623a. In particular, the portion of the spatial filter 1826 illustrated shows mask features with one transmissive region 1872a that is diagonally disposed with respect to the flow direction and one transmissive region 1872b that is perpendicularly disposed with respect to the flow direction. Although the embodiment of FIG. 18 is discussed in reference to the spatial filter 1826 of FIG. 16, it is recognized that the techniques described are equally applicable to the spatial filter 1726 of FIG. 17. Thus, the techniques described are applicable to calculation of object thickness in addition to object width.

As discussed previously, objects of interest in flow cytometry are not necessarily spherical. For example, red blood cells, budding yeast, sperm cells, or E. coli deviate from a spherical shape. The spatial filters 1726 and 1826 of FIGS. 16-18 are designed with the recognition that elongated objects often align in a fluidic channel by exposing their smallest hydrodynamic resistance to the flow direction 1623a as the resistance normally correlates with the exposed area. This means that the elongated axis is oriented in the flow direction 1623a.

As shown in the embodiment of FIG. 18, the object 1805 has a length L as measured in the x-direction and width, w, as measured in the y-direction. A spatial filter 1826 is arranged in the x-y plane and can be used to measure length and width of the object 1805. The object 1805 is illustrated as moving with respect to the spatial filter 1826 in the flow direction 1623a traversing transmissive region 1872a and transmissive region 1872b. The output signal 1850 that results from the object 1805 passing through the one diagonally disposed transmissive region 1872A and one perpendicularly disposed transmissive region 1872B are also illustrated in FIG. 18.

As shown in FIG. 18, the output signal 1850 has a transition time $t_1$ that results from the diagonally disposed transmissive region 1872a. This transmission time $t_1$ differs from a second transition time $t_2$ that results from the perpendicularly disposed transmissive region 1872B. The transition time $t_1$ for the diagonally disposed transmissive region 1872A having minimum feature sizes with a dimension d smaller than the length of the object can be calculated according to Equation 1.

$$t_1 = (((d + w \cdot \cos(\alpha))/\sin(\alpha)) + L)/v \tag{1}$$

where, v is the velocity of the object in the flow direction 1623a, L is the length of the object, d is the size of the transmissive feature as measured perpendicularly from one transmissive edge to a second transmissive edge, α is the angle of the diagonal transmissive feature as measured relative to the flow direction 1623a, and w is the width of the object as measured in the y-direction.

Similarly, the transition time $t_2$ for the perpendicularly disposed transmissive region 1872b having minimum feature sizes with a dimension d smaller than the length of the object can be calculated according to Equation 2.

$$t_2 = ((d + L)/v \tag{2}$$

where, v is the velocity of the object in the flow direction 1623c, L is the length of the object, and d is the size of the transmissive feature as measured perpendicularly from one transmissive edge to a second transmissive edge.

Given that the transition times $t_1$ and $t_2$ as well as velocity v, transmissive feature size d, angle α, and object length L are either known or can be calculated and/or measured, the Equation 1 can be rewritten to solve for the width, w. For example, perpendicularly disposed transmissive region 1872b may be used to determine the velocity v and the length L of objects in flow direction for minimum feature sizes having dimension d smaller than that of the objects. Alternatively, the particle velocity can be determined by measuring the time required for a particle reaching a subsequent feature that is a known pitch distance away from the first feature. Yet another way of determining the speed is by determining the FFT frequency of periodically spaced features and multiplying it with the periodic pitch distance. Indeed, as can be seen in the plot of output signal 1852, the light emitting area of the spatial filter 1826 now also depends on the thickness h of the object. Thus, the diagonally disposed transmissive region 1872a (with d also smaller than the object with regard to length L) allows for determination of a perpendicular size component such as thickness h or width. As can be geometrically ascertained, wider or thicker objects will exhibit longer transition times $t_1$ through the diagonally disposed transmissive region 1872a than slimmer and/or shorter objects.

Figure 19:
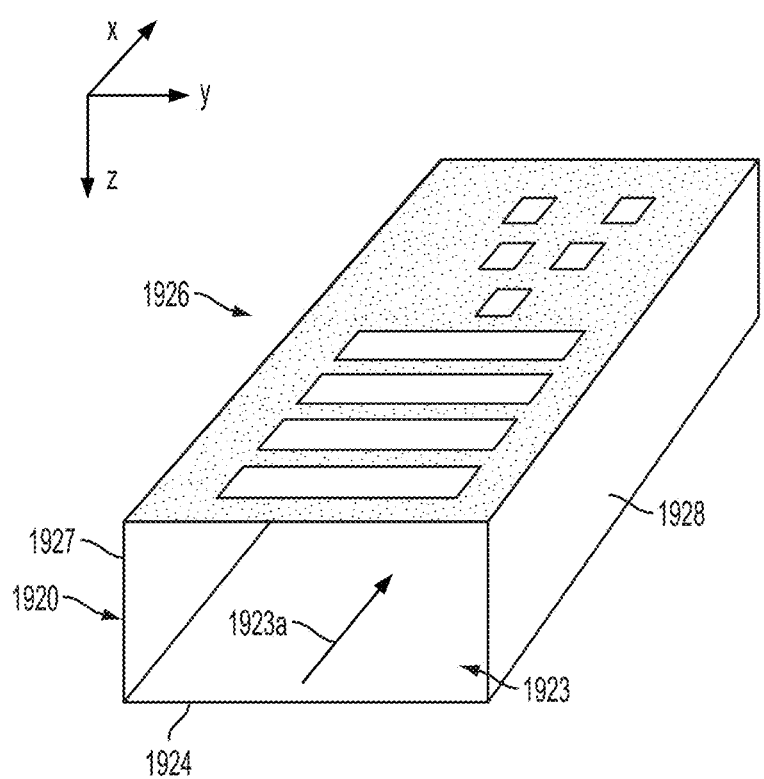
FIG. 19 is a perspective view of another spatial filter disposed in the x-y plane and having mask features that diverge across a lateral width thereof according to yet another example embodiment to allow for determination of a width of an object passing through the flow channel.

FIG. 19 shows a perspective view of a portion of a fluidic device 1920 and another embodiment of a portion of spatial filter 1926 that can be used for determining the width of an object. The fluidic device 1920 includes a flow channel 1923 having a flow direction 1923a, and confining members 1924, 1927, and 1928. The confining members 1924, 1927, and 1928 are positioned to define the flow channel 1923. The flow direction 1923a aligns generally with the x-direction of the Cartesian coordinate system illustrated in FIG. 19. In the embodiment shown, the spatial filter 1926 is mounted along a confining member (not shown) that extends generally along the x-y plane. In other embodiments, the spatial filter 1926 may be disposed externally to or within the flow channel 1923, and/or positioned relative to any of the illustrated confining members 1924, 1927, and 1928. A detector or multiple detectors (not shown) may be positioned in any appropriate location to sense modulated light passing through the filter 1926.

Figure 20:
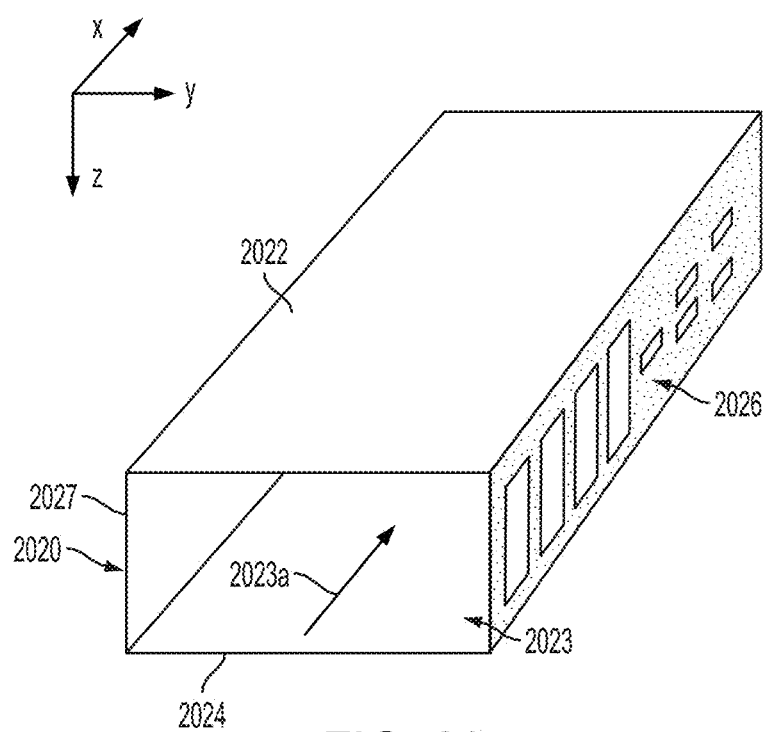
FIG. 20 a perspective view of the spatial filter of FIG. 21A disposed in the x-z plane and having mask features that diverge across a depth thereof according to yet another example embodiment to allow for determination of a thickness of an object passing through the flow channel.

Similar to the embodiment of FIG. 19, the embodiment of FIG. 20 illustrates a portion of a fluidic device 2020 and a spatial filter 2026 oriented for determining the thickness of an object. The fluidic device 2020 includes a flow channel 2023 having a flow direction 2023a, confining members 2022, 2024, and 2027. The confining members 2022, 2024, and 2028 are positioned to define the flow channel 2023. The flow direction 2023a aligns generally with the x-direction of the Cartesian coordinate system illustrated in FIG. 20. In the embodiment shown, the spatial filter 2026 is mounted along a confining member (not shown) that extends generally along the x-z plane.

In FIG. 19, the spatial filter 1926 is arranged in the x-y plane of the Cartesian coordinate system. The spatial filter 1926 has mask features that diverge laterally relative to one another in a direction generally perpendicular to the flow direction 1923a (i.e. the y-direction) to allow for a determination of the width of the object.

The spatial filter 2026 of FIG. 20 is arranged along the x-z plane of the Cartesian coordinate system and has mask features that diverge relative to one another along a depth of flow channel 2023 (i.e. the z-direction) to allow for a determination of the thickness of the object. Although the filters 1926 and 2026 are shown and described in reference to different embodiments, it should be understood that the filters described herein can be used in combination with one another or other filter designs.

Figure 21A:
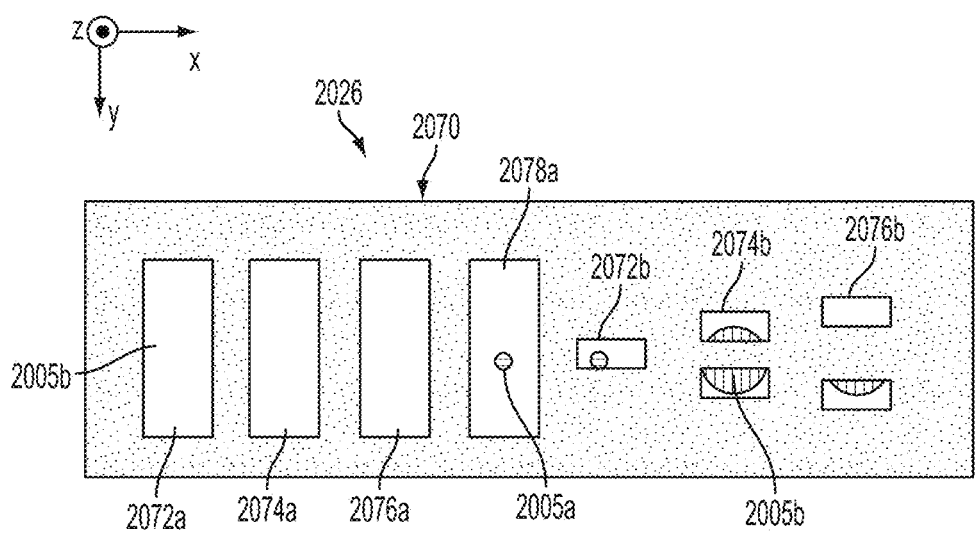
FIG. 21A is a plan view of the spatial filter of FIG. 20 with an object moving relative to the spatial filter in a flow direction of the flow channel.

FIG. 21A shows an enlarged top plan view of the spatial filter 1926 and 2026 of FIGS. 19 and 20 with objects 2005a and 2005b having different sizes including different widths disposed adjacent thereto. The spatial filter 2026 has mask features 2070 with transmissive regions 2072a, 2074a, 2076a, 2078a, 2072b, 2074b, and 2076b. Transmissive regions 2072a, 2074a, 2076a, 2078a, 2072b, 2074b, and 2076b have a repeating periodic pattern in the x-direction and transmissive regions 2072b, 2074b, and 2076b additionally have a diverging periodic pattern in the y-direction.

As shown in FIG. 21A, the transmissive regions 2072B, 2074B, and 2076B create a vanishing intensity (as measured by the amplitude) of the time domain signal that can be used to distinguish the objects 2005a and 2005b and allow for determination of the width of each object 2005a and 2005b (or thickness with respect to the spatial filter 2026 of FIG. 20).

Figure 21B:
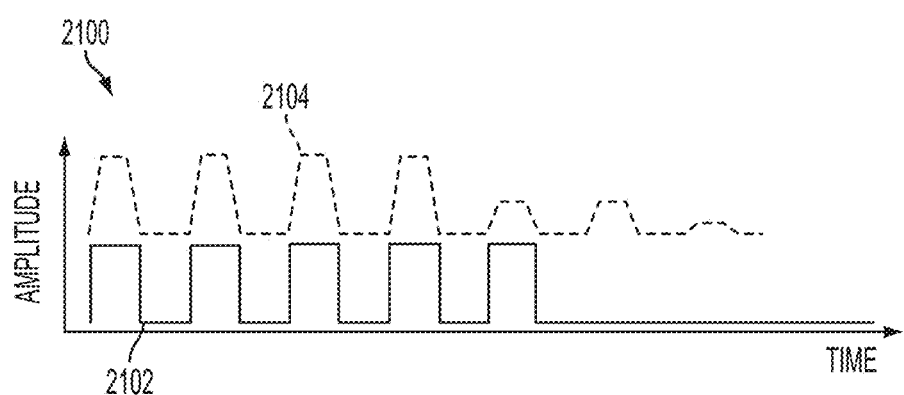
FIG. 21B is a plot of the time-varying electrical signals generated in response to the modulated light from each of the two objects moving relative to the spatial filter of FIG. 21A.

FIG. 21B is a simplified plot 2100 of the electrical signals 2102 and 2104 that result from the two objects 2005a and 2005b passing relative to spatial filter 2026. The signals result from the modulated light that has passed through the transmissive regions 2072a, 2074a, 2076a, 2078a, 2072b, 2074b, and 2076b of (or is blocked by) the spatial filter 2026. As shown in the plot 2100, the signal 2102 from smaller object 2005a has a more rapid rise time transition from a trough region to a peak region relative to signal 2104, and disappears (i.e. has an amplitude that becomes zero or substantially zero) even in the area of transmissive regions 2074b and 2076b. In contrast, the signal 2104 from larger object 2005b has a slower rise time transition from a trough region to a peak region relative to signal 2102, and does not disappear even in the area of transmissive regions 2074b, and 2076b.

An analyzer may compare characteristics of the time domain signal(s) such as the amplitude and/or rise time of the pulses to determine the length and/or width of the objects. This determination is informed by mask features 2070, which have a known size (lateral and longitudinal) and pattern. Thus, the output signal(s) may be dependent on the known mask pattern to allow for extraction of desired information including the width and length of the object. The determination of the length and width of the object may additionally be informed by, for example, comparing characteristics of the output signal(s) to reference output signals with known object light intensity, velocity, object size (i.e. length and width), and/or known object trajectory depth in the flow channel. In some embodiments, the time domain signal may be converted to the frequency domain and the decrease in amplitude of the frequency domain signal at the frequency of the mask features may be used to determine the object width or thickness.

Figure 22:
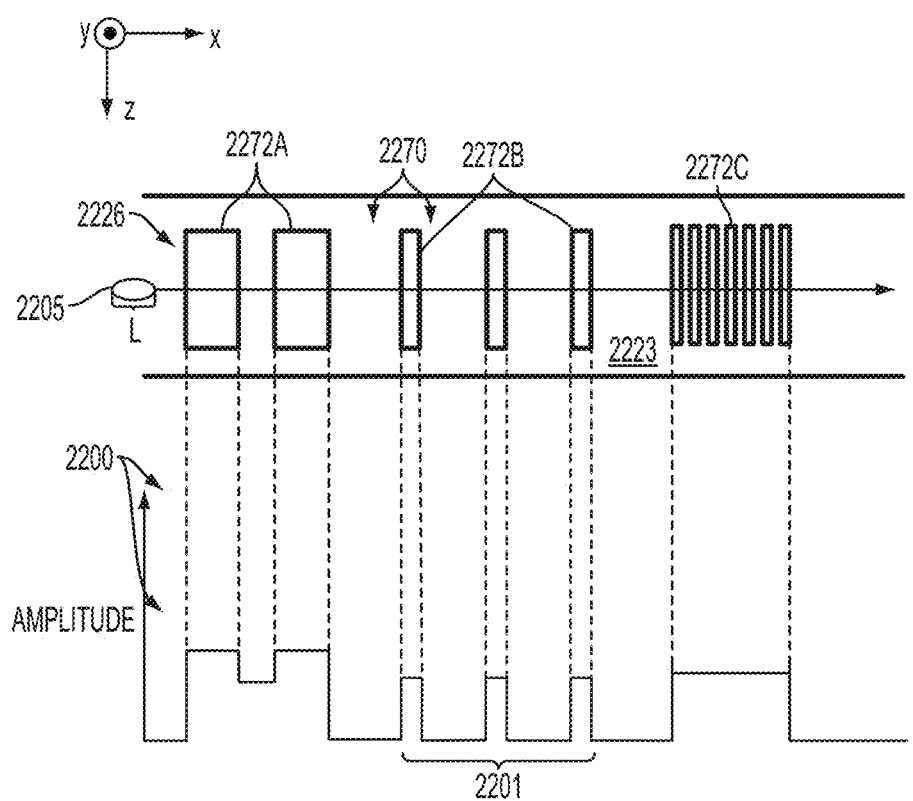
FIG. 22 is a plan view of another embodiment of a spatial filter with an object moving relative to the spatial filter in a flow direction of the flow channel and a time varying output signal that results.

FIG. 22 shows a top plan view of the spatial filter 2226 with an object 2205 moving along a flow direction relative to the spatial filter 2226. The spatial filter 2226 has mask features 2270 with transmissive regions 2272a, 2272b and 2272c. Transmissive regions 2272a, 2272b, and 2272c are patterned and sized differently in the x-direction. Thus, mask features 2270 have a varied size and periodic pattern in the x-direction.

As shown in FIG. 22, the transmissive regions 2272a, 2272b, and 2272c lead to different sensed light intensities and a time varying output signal 2200 with different amplitude characteristics. These amplitude characteristics, along with other characteristics such as the modulation frequency of the output signal that can be used to determine a length L of the object 2205. For example, the amplitude of the output signal 2200 resulting from transmissive region 2272a exceeds the amplitudes of the output signal that result from transmissive regions 2272b and 2272c because object 2205 is shorter than the transmissive regions 2272a and is longer than transmissive regions 2272b. Additionally, the portion of the output signal 2200 resulting from transmissive region 2272c has a diminished modulation due to the size and disposition of the transmissive region 2272c relative to the length of the object 2205.

Figure 23A:
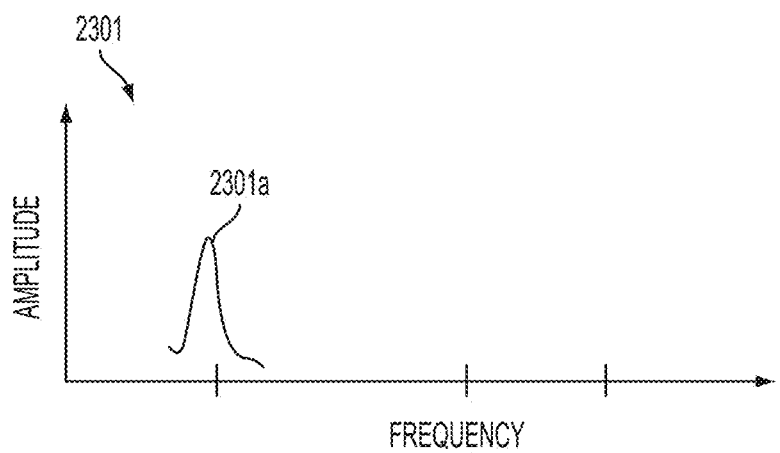
FIGS. 23A and 23B are plots of the frequencies that result from light modulated by the spatial filter of FIG. 22.
Figure 23B:
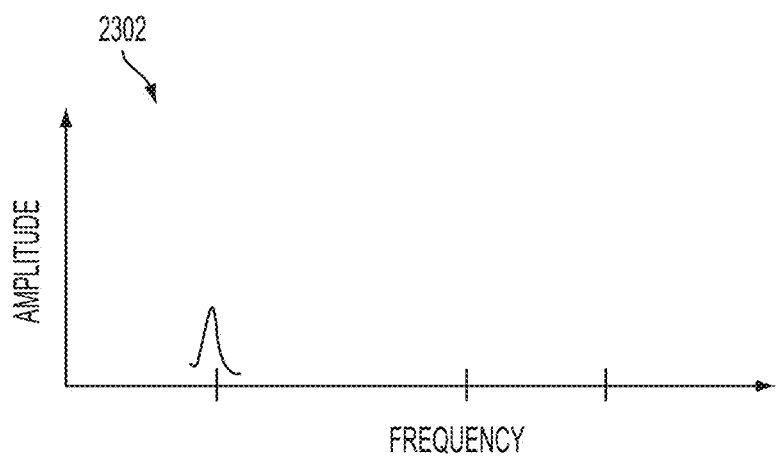

FIG. 23A shows a simplified plot 2301 of the frequency domain signal while the object 2205 is traversing mask features 2272b. FIG. 23B shows a simplified plot 2302 of the frequency domain signal while the object 2205 is traversing mask features 2272c. Plot 2301 of FIG. 23A shows a frequency component 2301a corresponding to the amplitude transitions 2201 in the time domain detector signal 2100 in FIG. 22. FIG. 23B shows the frequency domain plot taken at a later time when the object 2205 is traversing features 2272c. The frequency component 2301a of plot 2301 has diminished in the frequency domain plot 2302 of FIG. 23B because the length of the object is longer than the sum of the lengths of adjacent transmissive and opaque features 2272c, thus the intensity of the emanating light is not modulated by the features 2272c and the frequency component is largely reduced. According to these techniques, analysis of the frequency domain components that vanish or fall below a threshold value can be used to determine object length due to the diminished intensity modulation as a result of the length and disposition of the transmissive region 2272c relative to the length of the object 2205.

An analyzer may compare characteristics of the output signal(s) such as the amplitude and lack of a frequency component in the frequency domain signal to determine the length of the object. This determination is informed by mask features 2270, which have a known size (lateral and longitudinal) and pattern. Thus, the output signal(s) may be dependent on the known mask pattern to allow for extraction of desired information including the width and length of the object. The determination of the length and width of the object may additionally be informed by, for example, comparing characteristics of the output signal(s) to reference output signals with known object light intensity, velocity, object dimensions (i.e. length, width, and thickness), and/or known object trajectory depth in the flow channel.

In one embodiment, the analyzer is configured to determine when the diminished modulation of the time varying output signal 2200 in a peak region or trough region has fallen below a threshold value and compare the time varying output signal 2200 to at least one of a size and a periodic pattern of the mask features 2270. In other embodiments, the analyzer is configured to determine when the diminishment of the time varying output signal 2200 has fallen below a threshold value by determining when an intensity peak of the frequency domain signal disappears and/or falls below a second threshold value and compare a frequency at which the intensity peak of the frequency domain signal disappears due to at least one of a size and periodic pattern of the mask feature 2270.

Figure 24:
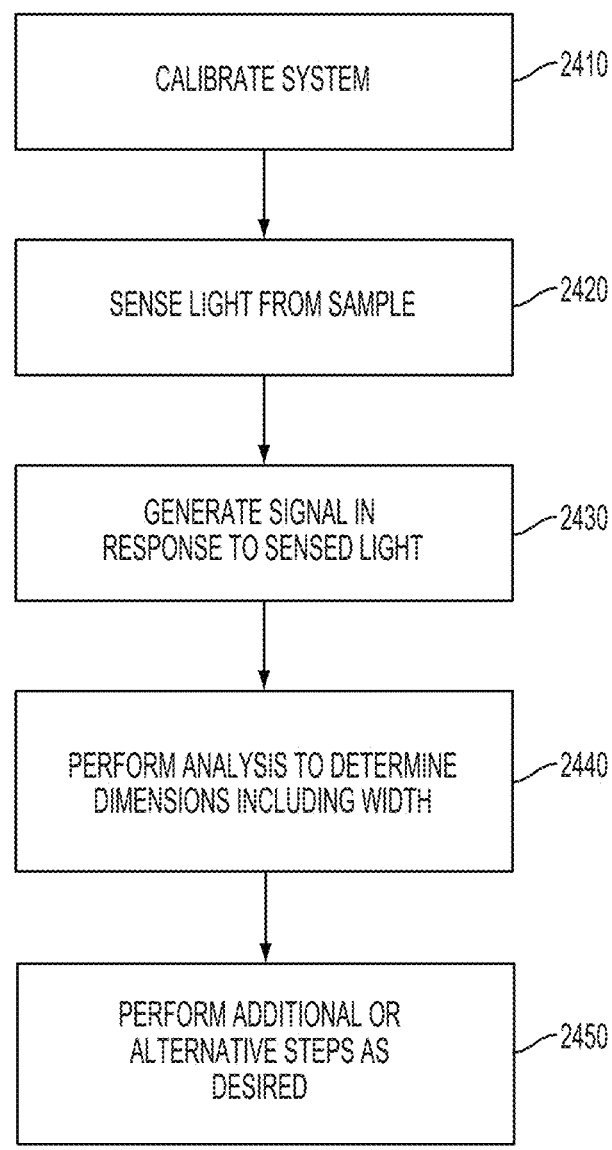
FIG. 24 shows a flow diagram of a method of analyzing a sample according to an example embodiment.

FIG. 24 shows a flow diagram of a method of analyzing a sample. As part of an initializing step 2410 for the system, objects of a known velocity, size, shape, depth, concentration and/or luminescence are passed through a flow channel relative to a spatial filter so that the system can be calibrated. The primary purpose of the calibration step is to perform a system validation to verify that the system is tuned properly, to ensure that all the parameters are set properly, and that the system can correctly identify the type of objects and successfully determine their length, width and thickness as the case may be. The calibration step 2410 is a common practice in many cytometry applications. For example, prior to running the actual sample to be measured, and in frequent time intervals thereafter, a pre-made mixture of certain object sizes (e.g., fluorescent spheres of size 2 um and 6.2 um as shown in FIG. 10B) is applied through the flow channel to verify that the system can correctly distinguish the spheres and determine their sizes. The spheres may additionally be coated with different materials to simulate for example different intensity levels and/or other system aspects. If the system is found to over time drift away from the known object dimensions, the system parameters can be tuned to compensate and bring the system back to within accuracy specification. Light from an object of interest is sensed moving through the flow channel relative to the spatial filter in step 2420. As discussed previously, the sensed light is modulated according to mask features. An electrical signal is generated in response to the sensed light as part of step 2430. In step 2440, the signal is analyzed determine one or more dimensions of the object including at least a width based upon the signal. Additional steps 2450 and/or alternative steps can be performed as desired to support the method described.

Figure 25:
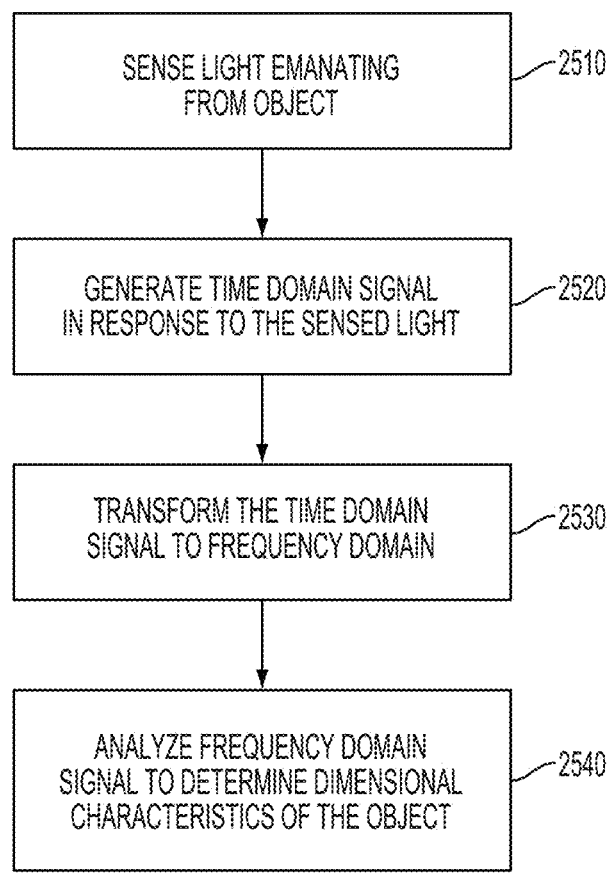
FIG. 25 shows a flow diagram of a method of analyzing a sample using frequency domain analysis according to an example embodiment.

Some embodiments involve techniques for determining dimensional characteristics of objects in a flow path based on frequency domain analysis. For example, it is possible to determine one or more of length, width, and thickness of an object using frequency domain techniques. FIG. 25 is a flow diagram illustrating a method of using frequency domain analysis to determine object dimensional characteristics. Modulated light emanating from an object is sensed 2510 and a time domain signal is generated 2520 in response to the sensed light. The time domain signal is transformed 2530 to the frequency domain. The frequency domain signal is analyzed 2540 to determine dimensional characteristics of the object.

As previously discussed, in some embodiments the frequency domain analysis involves measuring object width using mask with features disposed longitudinally along the spatial filter, wherein the mask features have a frequency that varies laterally across a width of the mask, as discussed in connection with FIGS. 6A-6C. In some embodiments, the frequency domain analysis involves measuring one or more object dimensions using a mask that includes mask features located in a central region to determine a first object dimension and using mask features that change in frequency laterally to measure a second object dimension as discussed in conjunction with FIGS. 12-15.

In some embodiments, the frequency domain analysis involves measuring one or more object dimensions based on a diminishing or vanishing frequency component in the frequency domain signal as described in conjunction with FIGS. 19 through 21B and FIGS. 22 through 23B. In some implementations, the analyzer is configured to determine the one or more dimensions of the object, e.g., the dimension (width) of the object perpendicular to the flow direction, based upon one or more of a diminishing of vanishing frequency component of the frequency transformed signal as the object moves relative to the spatial filter. For example, the analyzer may configured to correlate the diminishing modulation to the one or more dimensions of the object by determining a frequency at which the amplitude of the frequency domain signal falls below a threshold value. The analyzer may be configured to compare a frequency at which an amplitude of in the frequency domain signal falls below a threshold value to at least one of a length and periodic pattern the mask features.

In some embodiments, the frequency domain analysis involves measuring one or more object dimensions based on a ratio of frequency components in the frequency domain signal as discussed in conjunction with FIGS. 8A through 8F. According to this analysis, the signal generated in response to the modulated light includes a first signal component of a first frequency superimposed with a second signal component of a second frequency, wherein the first frequency is different from the second frequency. The analyzer is configured to perform a Fourier transform (FT) of the signal, e.g., a fast Fourier transform (FFT) and to compare an amplitude of the FT at the first frequency to an amplitude of the FT at the second frequency to determine a length of the object. In some implementations, the second frequency is a multiple of the first frequency. The analyzer may be configured to determine a length of the object based on the ratio between the amplitude of the first signal component and the amplitude of the second signal component.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. An assembly, comprising:
 a spatial filter arranged in a Cartesian coordinate system having orthogonal x, y, and z axes, the spatial filter including mask features that are more light transmissive and mask features that are less light transmissive, the mask features arranged along the x-axis in a flow direction of a flow path;
 a detector positioned to detect light emanating from at least one object in the flow path, the object having a width along the y-axis, a thickness along the z-axis, and a length along the x-axis, the light emanating from the object time modulated according to the mask features as the object moves along the flow path, the detector configured to generate a time-varying electrical signal in response to the detected light; and an analyzer configured to determine the width or thickness of the object based on the signal.

2. The assembly of claim 1, wherein:
the spatial filter includes first mask features that vary in frequency along the y-axis of the spatial filter;
the signal includes a number of frequency components dependent on the object width; and
the analyzer is configured to determine the width of the object based on the number of frequency components.

3. The assembly of claim 1, wherein:
the spatial filter is configured to cause a decrease or increase in an intensity of the modulated light along the x-axis of the spatial filter at a frequency associated with the arrangement of mask features;
the detector is configured to sense the modulated light and to generate a signal having an increase or decrease in amplitude at the frequency associated with the arrangement of mask features; and
the analyzer is configured to determine the object width based on the increase or decrease in the amplitude of the signal.

4. The assembly of claim 1, wherein the analyzer is configured to determine the width and the length of the object.

5. The assembly of claim 4, wherein the spatial filter comprises:
light transmissive features arranged to have a frequency that changes along the x-axis of the spatial filter and that have a frequency that changes along the y-axis of the spatial filter.

6. An assembly, comprising:
a spatial filter arranged in a Cartesian coordinate system having orthogonal x, y, and z axes, the spatial filter including mask features that are more light transmissive and mask features that are less light transmissive, the mask features arranged along the x-axis in a flow direction of a flow path;
a detector positioned to detect light emanating from at least one object in the flow path, the object having a width along the y-axis, a thickness along the z-axis, and a length along the x-axis, the light emanating from the object time modulated according to the mask features as the object moves along the flow path, the detector configured to generate a time-varying electrical signal in response to the detected light;
an analyzer configured to determine the width or thickness of the object based on the signal, wherein:
the spatial filter comprises at least a first portion and at least a second portion in any order along the x-axis; and
light modulated by the first portion of the spatial filter includes information about the object width and light modulated by the second portion of the spatial filter includes information about a length of the object along the x-axis.

7. The assembly of claim 6, wherein:
the length of the object is less than or equal to a length of more light transmissive mask features of the second portion; and
the length of the object is determined based on rise times of pulses in the signal, the pulses generated by the detector in response to the light modulated by the second portion of the spatial filter as the object traverses the more light transmissive features of the second portion.

8. The assembly of claim 6, wherein:
the length of the object is greater than a length of more light transmissive mask features of the second portion; and
the length of the object is determined based on widths of pulses in the signal, the pulses generated by the detector in response to the light modulated by the second portion of the spatial filter as the object traverses the more light transmissive features of the second portion.

9. An assembly, comprising:
a spatial filter arranged in a Cartesian coordinate system having orthogonal x, y, and z axes, the spatial filter including mask features that are more light transmissive and mask features that are less light transmissive, the mask features arranged along the x-axis in a flow direction of a flow path;
a detector positioned to detect light emanating from at least one object in the flow path, the object having a width along the y-axis, a thickness along the z-axis, and a length along the x-axis, the light emanating from the object time modulated according to the mask features as the object moves along the flow path, the detector configured to generate a time-varying electrical signal in response to the detected light; and
an analyzer configured to determine the width and thickness of the object based on the signal, wherein the spatial filter comprises:
first light transmissive features that extend at least partially across the spatial filter substantially parallel to the y-axis; and
second light transmissive features that extend at least partially across the spatial filter at an acute angle to the y-axis.

10. An assembly arranged in relation to Cartesian coordinate system having orthogonal x, y, and z axes, the assembly comprising:
a spatial filter disposed in a plane along a flow direction of a flow path, the spatial filter including mask features that are more light transmissive and mask features that are less light transmissive;
a detector positioned to detect light emanating from at least one object in the flow path, the object having a width along the y-axis, a thickness along the z-axis, and a length along the x-axis, the light emanating from the object time modulated according to the mask features as the object moves along the flow path, the detector configured to generate a time-varying electrical signal in response to the detected light;
signal processing circuitry configured to transform the time varying signal to a frequency domain signal; and
an analyzer configured to determine the width or the thickness and the length of the object based on the frequency domain signal.

11. The assembly of claim 10, wherein the analyzer is configured to determine the width or the thickness of the object based on a number of frequency components in the frequency domain signal.

12. The assembly of claim 11, wherein the analyzer is configured to determine the length of the object based on a difference between two frequency components in the frequency domain signal.

13. The assembly of claim 10, wherein the analyzer is configured to determine the width or the thickness of the object based on a monotonic decrease or increase of a frequency component in the frequency domain signal.

14. The assembly of claim 10, wherein the analyzer is configured to determine the length of the object based on a monotonic decrease or increase of a frequency component in the frequency domain signal.

15. The assembly of claim 10, wherein the analyzer is configured to simultaneously determine the length and the width or the thickness.

16. A method, comprising:
modulating light using a spatial filter disposed along a longitudinal x-axis of a flow path, the spatial filter including mask features that are more light transmissive and mask features that are less light transmissive;
detecting light emanating from at least one object in the flow path, the object having a width along a y-axis, a thickness along a z-axis, and length along the x-axis, the light emanating from the object time modulated according to the mask features as the object moves along the longitudinal axis of the flow path; and
generating a time-varying electrical signal in response to the detected light, the time varying electrical signal including information about the width or the thickness of the object.

17. The method of claim 16, wherein the electrical signal includes information about the length of the object.

18. The method of claim 16, further comprising:
transforming the time varying signal to a frequency domain signal; and
determining the length and the width or thickness of the object based on the frequency domain signal.

19. The method of claim 18, wherein the determining comprises determining the width and the length.

20. The method of claim 18, wherein determining the length and the width or thickness comprises determining the width and length by counting a number of frequency dominant components in the frequency domain signal.

21. A device arranged in relation to Cartesian coordinate system having orthogonal x, y, and z axes, the device comprising:
a spatial filter including mask features that are more light transmissive and features that are less light transmissive, the mask features disposed along the x-axis in the flow direction of a flow path;
at least one detector positioned to detect light emanating from at least one object in the flow path, the object having a width along the y-axis, a thickness along the z-axis, and length along the x-axis, the light emanating from the object time modulated according to the mask features as the object moves along the flow direction of the flow path, the detector configured to generate a time-varying electrical signal in response to the detected light, the time-varying electrical signal containing information about at least two of the length, width, and thickness of the object.

22. The device of claim 21, wherein:
the spatial filter includes first mask features that vary in frequency along the y-axis of the spatial filter;
the signal includes a number of frequency components dependent on the width of the object.

23. The device of claim 21, wherein:
the spatial filter is configured to cause a decrease or increase in an intensity of a the modulated light along the x-axis of the spatial filter at a frequency associated with the arrangement of mask features;
the detector is configured to sense the modulated light and to generate a signal having an increase or decrease in amplitude at the frequency associated with the arrangement of mask features.

24. A device arranged in relation to Cartesian coordinate system having orthogonal x, y, and z axes, the device comprising:
a spatial filter including mask features that are more light transmissive and features that are less light transmissive, the mask features disposed along the x-axis in the flow direction of a flow path;
at least one detector positioned to detect light emanating from at least one object in the flow path, the object having a width along the y-axis, a thickness along the z-axis, and length along the x-axis, the light emanating from the object time modulated according to the mask features as the object moves along the flow direction of the flow path, the detector configured to generate a time-varying electrical signal in response to the detected light, the time-varying electrical signal containing information about at least two of the length, width, and thickness of the object, wherein:
the spatial filter comprises at least a first portion and at least a second portion in any order along the x-axis; and
light modulated by the first portion of the spatial filter includes information about the object width and light modulated by the second portion of the spatial filter includes information about a length of the object.

25. The device of claim 24, wherein:
the length of the object is less than or equal to a length of more light transmissive mask features of the second portion; and
the length of the object is related to rise times of pulses in the signal, the pulses generated by the detector in response to the light modulated by the second portion of the spatial filter as the object traverses the more light transmissive features of the second portion.

26. The device of claim 24, wherein:
the length of the object is greater than a length of more light transmissive mask features of the second portion; and
the length of the object is related to widths of pulses in the signal, the pulses generated by the detector in response to the light modulated by the second portion of the spatial filter as the object traverses the more light transmissive features of the second portion.

27. A device arranged in relation to Cartesian coordinate system having orthogonal x, y, and z axes, the device comprising:
a spatial filter including mask features that are more light transmissive and features that are less light transmissive, the mask features disposed along the x-axis in the flow direction of a flow path;
at least one detector positioned to detect light emanating from at least one object in the flow path, the object having a width along the y-axis, a thickness along the z-axis, and length along the x-axis, the light emanating from the object time modulated according to the mask features as the object moves along the flow direction of the flow path, the detector configured to generate a time-varying electrical signal in response to the detected light, the time-varying electrical signal containing information about at least two of the length, width, and thickness of the object, wherein the spatial filter comprises:
first light transmissive features that extend at least partially across the spatial filter substantially parallel to the y-axis; and
second light transmissive features that extend at least partially across the spatial filter at an angle to the y-axis.

28. The device of claim 21, wherein the spatial filter comprises:
  light transmissive features arranged to have a frequency that changes along the x-axis of the spatial filter and that have a frequency that changes along the y-axis of the spatial filter.

29. A device arranged in relation to Cartesian coordinate system having orthogonal x, y, and z axes, the device comprising:
  first and second spatial filters, each spatial filter including mask features that are more light transmissive and features that are less light transmissive, the mask features disposed along the x-axis in the flow direction of a flow path, the first spatial filter arranged in first plane and the second spatial filter arranged in a second plane;
  first and second detectors positioned to detect light emanating from at least one object in the flow path, the object having a width along the y-axis, a thickness along the z-axis, and length along the x-axis, the light emanating from the object time modulated according to the mask features as the object moves along the flow direction of the flow path, the first detector configured to generate a first time-varying electrical signal in response to the detected light, the first time-varying electrical signal containing information about the width of the object, the second detector configured to generate a second time-varying electrical signal in response to the detected light, the second time-varying electrical signal containing information about the thickness of the object.

30. The device of claim 29, wherein at least one of the first electrical signal and the second electrical signal include information about the length of the object.

31. The device of claim 29, further comprising an analyzer configured to simultaneously determine the width and thickness of the object.

* * * * *